(12) United States Patent
Dvorak et al.

(10) Patent No.: US 12,184,448 B2
(45) Date of Patent: *Dec. 31, 2024

(54) PROCESSING SYSTEM, RELATED INTEGRATED CIRCUIT, DEVICE AND METHOD

(71) Applicants: STMicroelectronics Application GMBH, Aschheim-Dornach (DE); STMicroelectronics Design & Application S.R.O., Prague (CZ)

(72) Inventors: Vaclav Dvorak, Mratín (CZ); Fred Rennig, Nandlstadt (DE)

(73) Assignees: STMicroelectronics Application GMBH, Aschheim-Dornach (DE); STMicroelectronics Design & Application S.R.O., Prague (CZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,590

(22) Filed: Oct. 18, 2023

(65) Prior Publication Data
US 2024/0048405 A1 Feb. 8, 2024

Related U.S. Application Data

(63) Continuation of application No. 17/814,113, filed on Jul. 21, 2022, now Pat. No. 11,824,681.

(30) Foreign Application Priority Data

Aug. 18, 2021 (IT) .......................... 102021000022037

(51) Int. Cl.
*H04L 12/40* (2006.01)
*G06F 13/42* (2006.01)

(52) U.S. Cl.
CPC ...... *H04L 12/40013* (2013.01); *G06F 13/423* (2013.01); *H04L 12/40169* (2013.01); *H04L 2012/40215* (2013.01)

(58) Field of Classification Search
CPC ............ H04L 12/4016; H04L 12/4001; G06F 13/423
See application file for complete search history.

(56) References Cited

U.S. PATENT DOCUMENTS 11,824,681 B2 * 11/2023 Dvorak ............ H04L 12/40169
2008/0284846 A1 11/2008 Kogane et al.
(Continued)

OTHER PUBLICATIONS

"Road vehicles—Controller area network (CAN) Part 2: High-speed medium access unit," International Standard, ISO 11898-2, Second Edition, Dec. 15, 2016, 38 pages.
(Continued)

*Primary Examiner* — Phong H Dang
(74) *Attorney, Agent, or Firm* — Slater Matsil, LLP

(57) ABSTRACT

In an embodiment a method for operating a processing system includes programming, by a microprocessor during a CAN FD Light data transmission phase, a control register of a Serial Peripheral Interface (SPI) communication interface of the processing system in order to activate a master mode; generating, by the microprocessor during the CAN FD Light data transmission phase, a transmission CAN FD Light frame; storing, by the microprocessor during the CAN FD Light data transmission phase, the transmission CAN FD Light frame to a memory; and activating, by the microprocessor during the CAN FD Light data transmission phase a first DMA channel so that the first DMA channel sequentially transfers the transmission CAN FD Light frame from the memory to a transmission shift register in the SPI communication interface.

20 Claims, 9 Drawing Sheets

(56) References Cited

U.S. PATENT DOCUMENTS

| | | |
|---|---|---|
| 2010/0146157 A1 | 6/2010 | Choi et al. |
| 2013/0311699 A1 | 11/2013 | Birsan et al. |
| 2014/0071995 A1 | 3/2014 | Hartwich |
| 2015/0195765 A1 | 7/2015 | Bhardwaj |
| 2016/0344552 A1* | 11/2016 | Sharma ................ G05B 19/418 |
| 2017/0185548 A1* | 6/2017 | Sakuma .............. G06F 13/4282 |
| 2020/0286571 A1 | 9/2020 | McCracken et al. |
| 2021/0058495 A1 | 2/2021 | Yamakawa |
| 2021/0303504 A1 | 9/2021 | Nandlinger et al. |
| 2023/0053798 A1 | 2/2023 | Rennig et al. |

OTHER PUBLICATIONS

"CAN FD Light Part 1: Data link layer and physical coding sub-layer requirements of responder nodes," Draft Specification, CiA 604-1, Version 1.0.0, CAN in Automation (CIA) e.V., Mar. 8, 2022, 16 pages.

"Road vehicles—Controller area network (CAN)—Part 1: Data link layer and physical signalling," International Standard, ISO 11898-1, Second Edition, Dec. 15, 2015, 74 pages.

"AN4776 Application note, General-purpose timer cookbook for STM32 microcontrollers," www.st.com, downloaded from https://www.st.com/resource/en/application_note/dm00236305-generalpurpose-timer-cookbook-for-stm32-microcontrollers-stmicroelectronics.pdf on Aug. 29, 2022, Jul. 2019, 72 pages.

St Life Augmented, "I2S protocol emulation on STM32L0 Series microcontrollers using a standard SPI peripheral", Application note, AN5086, www.st.com, Dec. 2017, 28 pages.

* cited by examiner

PROCESSING SYSTEM, RELATED INTEGRATED CIRCUIT, DEVICE AND METHOD

CROSS-REFERENCE TO RELATED APPLICATIONS

This application is a Continuation application of U.S. application Ser. No. 17/814,113, filed Jul. 21, 2022, which claims the benefit of Italian Application No. 102021000022037, filed on Aug. 18, 2021, which application is hereby incorporated herein by reference.

TECHNICAL FIELD

Embodiments of the present disclosure relate to a microcontroller configured to exchange data via a CAN FD (Controller Area Network Flexible Data-Rate) bus.

BACKGROUND

FIG. 1 shows a typical electronic system, such as the electronic system of a vehicle, comprising a plurality of processing systems 10, such as embedded systems or integrated circuits, e.g., a Field Programmable Gate Array (FPGA), a Digital Signal Processor (DSP) or a microcontroller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to vehicle control bus via a gateway. Typically, the processing systems 10 are located at different positions of the vehicle and may include, e.g., an Engine Control Unit, a Transmission Control Unit (TCU), an Antilock Braking System (ABS), a Body Control Module (BCM), and/or a navigation and/or multimedia audio system. Accordingly, one or more of the processing systems 10 may also implement real-time control and regulation functions. These processing systems are usually identified as Electronic Control Units.

FIG. 2 shows a block diagram of an exemplary digital processing system 10, in particular a microcontroller, which may be used as any of the processing systems 10 of FIG. 1.

In the example considered, the processing system 10 comprises a microprocessor 102, usually the Central Processing Unit (CPU), programmed via software instructions. Usually, the software executed by the microprocessor 102 is stored in a non-volatile program memory 104, such as a Flash memory or EEPROM. Thus, the memory 104 is configured to store the firmware of the processing unit 102, wherein the firmware includes the software instructions to be executed by the microprocessor 102. Generally, the non-volatile memory 104 may also be used to store other data, such as configuration data, e.g., calibration data.

The microprocessor 102 usually has associated also a volatile memory 104b, such as a Random-Access-Memory (RAM). For example, the memory 104b may be used to store temporary data.

As shown in FIG. 2, usually the communication with the memories 104 and/or 104b is performed via one or more memory controllers 100. The memory controller(s) 100 may be integrated in the microprocessor 102 or connected to the microprocessor 102 via a communication channel, such as a system bus of the processing system 10. For example, the system bus may comprise one or more bus systems, e.g., based on the Advanced extensible Interface (AXI) bus architecture, and/or a Network-on-Chip (NoC).

Similarly, the memories 104 and/or 104b may be integrated with the microprocessor 102 in a single integrated circuit, or the memories 104 and/or 104b may be in the form of a separate integrated circuit and connected to the microprocessor 102, e.g., via the traces of a printed circuit board.

In the example considered, the microprocessor 102 may have associated one or more (hardware) resources/peripherals 106 selected from the group of:

- one or more communication interfaces IF, e.g., for exchanging data via the communication system 20, such as a Universal asynchronous receiver/transmitter (UART), Serial Peripheral Interface Bus (SPI), Inter-Integrated Circuit ($I^2C$), Controller Area Network (CAN) bus, and/or Ethernet interface, and/or a debug interface; and/or
- one or more analog-to-digital converters AD and/or digital-to-analog converters DA; and/or
- one or more dedicated digital components DC, such as hardware timers and/or counters, or a cryptographic co-processor; and/or
- one or more analog components AC, such as comparators, sensors, such as a temperature sensor, etc.; and/or
- one or more mixed signal components MSC, such as a PWM (Pulse-Width Modulation) driver.

Generally, a dedicated digital components DC may also correspond to a FPGA integrated in the processing system 10. For example, in this case, the memory 104 may also comprise the program data for such a FPGA.

For example, for this purpose, the system bus may indeed comprise an Advanced Microcontroller Bus Architecture (AMBA) High-performance Bus (AHB), and an Advanced Peripheral Bus (APB) used to connect the resources/peripherals 106 to the AMBA AHB bus.

Accordingly, the digital processing system 10 may support different functionalities. For example, the behavior of the microprocessor 102 is determined by the firmware stored in the memory 104, e.g., the software instructions to be executed by a microprocessor 102 of a micro-controller 10. Thus, by installing a different firmware, the same hardware (micro-controller) can be used for different applications.

As mentioned before, in many applications, data have to be exchanged between several processing systems 10. For example, in the automotive sector, and also in many other areas, one or more CAN buses are often used to exchange data between processing systems 10. More specifically, in many applications, the processing system 10 should be connected to a CAN FD Light bus. For example, the CAN FD Light protocol is described in documents "CANFD Light Specification and test plan", CAN in Automation (CiA) 604-1, version 0.0.6, or "*CAN FD Light Network Protocol and Implementation*", EuES003-06, version 1.3, which are hereby incorporated herein by reference.

For example, FIG. 3 shows a typical situation, where a first processing system $10_1$ and a second processing system $10_2$ are connected to a CAN FD Light bus 20.

For example, each of the processing systems $10_1$ and $10_2$, may comprise:

- a CAN FD bus transceiver 320 configured to be connected to the CAN bus 20;
- a processing unit 102; and
- a communication interface IF configured to connect the processing unit 102 to the CAN bus transceiver 320;

For example, such additional CAN bus transceivers 320 are usually required, because the CAN bus 20 uses different signal levels than the processing unit 102 and/or in order to implement a galvanic isolation. For example, in case of the CAN FD Light protocol, the transceivers 320 are Controller Area Network Flexible Data-Rate (CAN FD) transceivers.

For example, conventional CAN bus transceivers 320 comprises two interfaces. The first interface is configured to exchange data via the CAN bus 20 by transmitting and receiving differential non-return-to-zero (NRZ) encoded signals. Conversely, the second interface is configured to receive a transmission signal Tx and provide a reception signal Rx, wherein the transmission signal Tx and the reception signal Rx are NRZ signals, preferably unipolar non-return-to-zero level (NRZ-L) encoded signals, such as binary-encoded signals being set to high (typically the supply voltage of the processing unit 102) for transmitting a logic "1" or low (typically ground) for transmitting a logic "0".

Accordingly, the communication interface IF may provide the NRZ/binary encoded transmission signal TX to the transceiver 320 and receive the NRZ/binary encoded reception signal RX from the transceiver 320. In turn, the transceiver 320 manages the data exchange on the CAN bus 20. Accordingly, the communication interface IF implements (at least) the data link layer and optional further higher protocol layers, while the transceivers 320 manages the physical layer. Accordingly, the interface IF may implement a CAN FD Light controller.

As shown in FIG. 3, the transceivers 320 may be provided in the form of a separate integrated circuit 32 connected to an integrated circuit 30 comprising the processing unit 102, and the hardware interface IF (see, e.g., processing system 10₁), or the transceivers 320 may be integrated in the integrated circuit 30 comprising the processing unit 102, and the hardware interface IF (see, e.g., processing system 10₂). Generally, the CAN FD Light controller IF may also be integrated in the integrated circuit 32 of the transceiver 320.

SUMMARY

Embodiment provide solutions for implementing a CAN FD Light controller in a microcontroller.

As mentioned before, various embodiments relate to a processing system, such as an integrated circuit, e.g., a micro-controller, adapted to transmit and receive CAN FD Light frames. Specifically, in various embodiments, the processing system is configured to transmit and receive CAN FD Light frames via a Serial Peripheral Interface (SPI) communication interface.

Specifically, in this case, the processing system comprises a transmission terminal configured to provide a transmission signal, a reception terminal configured to receive a reception signal and a clock terminal. The SPI communication interface is connected to the transmission terminal and the reception terminal, and comprises a control register configured to store data identifying a clock scaling factor and data identifying a mode of operation, wherein the mode of operation indicates a master mode or a slave mode.

For example, the SPI communication interface may comprise a transmission shift register of a given word size configured to generate the transmission signal by sequentially providing the content of the transmission shift register in response to a first clock signal, a reception shift register of the given word size configured to sequentially add the logic level of the reception signal to the content of the reception shift register in response to a second clock signal, and a clock downscale circuit configured to receive a clock signal and generate a downscaled clock signal by downscaling the clock signal as a function of the clock scaling factor.

For example, in the master mode, the SPI communication interface may provide the downscaled clock signal as the first clock signal to the transmission shift register. Typically, the downscaled clock signal is also provided as the second clock signal to the reception shift register.

Conversely, in the slave mode, the SPI communication interface may provide a clock signal received at the clock terminal as the second clock signal to the reception shift register. Typically, the clock signal received at the clock terminal is also provided as the first clock signal to the transmission shift register.

In various embodiments, the processing system comprises also a microprocessor programmable via software instructions, a memory controller configured to be connected to a memory and a communication system connecting the microprocessor, the memory controller and the SPI communication interface.

As mentioned before, the processing system is configured to transmit and receive CAN FD Light frames via the SPI communication interface. In this case, the transmission terminal and the reception terminal should be connected to a CAN FD transceiver.

Due to the fact that CAN FD Light frames are usually larger than the word size of the transmission shift register and the reception shift register, in various embodiments, the processing system comprises a first DMA channel configured to transfer packets of the given word size from the memory to the transmission shift register and a second DMA channel configured to transfer packets of the given word size from the reception shift register to the memory.

Moreover, due to the fact that the SPI communication interface is a synchronous interface, in various embodiments, the processing system comprises the following additional blocks for receiving a CAN FD Light frame:

an edge detector configured to assert a first control signal in response to detecting a falling edge in the reception signal;

a first hardware timer circuit configure to, when enabled, to generate a clock signal at the clock terminal; and a second hardware timer circuit comprising a counter configure to, when enabled, increase a count value and assert a second control signal in response to determining that the count value reaches a given threshold value.

Specifically, the edge detector is used to detect the start of a new CAN FD Light frame, the first hardware timer circuit is used to generate the clock signal for the SPI communication interface, and the second hardware timer circuit is used to detect the end of the CAN FD Light frame.

Specifically, in various embodiments, the counter of the second hardware timer circuit is configure to, when enabled, assert the second control signal in response to determining that the reception signal is set to high for a given time threshold, wherein the time threshold corresponds at least to the duration of eight clock cycles of the clock signal generated by the first hardware timer circuit, and wherein the counter of the second hardware timer circuit is configured to be reset in response to detecting that the reception signal is low. Accordingly, in this case, the second counter detects the presence of eight consecutive bits being set to high, which corresponds to the end-of-frame indication of a CAN FD Light frame.

Conversely, in various embodiments, the given threshold value of the second hardware timer circuit corresponds at least to the duration of a given maximum number of clock cycles of the clock signal generated by the first hardware timer circuit. Accordingly, in this case, the second counter signals that a given maximum number of bits have been received.

In various embodiments, the first hardware timer circuit and/or the second hardware timer circuit may be general purpose hardware timer circuits. Preferably, the first hardware timer circuit implements a Pulse Width Modulation (PWM) signal generator. For this purpose, the first hardware timer circuit may comprise a counter configure to, when enabled, to generate the clock signal as a PWM signal.

Accordingly, the processing system may manage a CAN FD Light data transmission mode and/or CAN FD Light data reception mode, Specifically, in the CAN FD Light data transmission mode, the microprocessor may be configured to program the control register of the SPI communication interface in order to activate the master mode, generate a transmission CAN FD Light frame, store the transmission CAN FD Light frame to the memory, and activate the first DMA channel, whereby the first DMA channel sequentially transfers the transmission CAN FD Light frame from the memory to the transmission shift register and the SPI communication interface transmits the respective data stored to the transmission shift register.

Conversely, in the CAN FD Light data reception mode, the microprocessor may be configured to program the control register of the SPI communication interface in order to activate the slave mode, and then wait that the first control signal, such as an interrupt signal, is asserted by the first timer circuit, thus indicating the start of a reception CAN FD Light frame. In response to the first control signal, the microprocessor may then enable the first hardware timer circuit and the second hardware timer circuit, whereby the second DMA channel is configured to transfer packets of the given word size from the reception shift register to the memory, thereby sequentially transferring the reception CAN FD Light frame from the reception shift register to the memory. The microprocessor then waits that the second control signal, such as an interrupt signal, is asserted by the second timer circuit, thus indicating the end of the reception CAN FD Light frame. Accordingly, in response to the second control signal, the microprocessor may read the reception CAN FD Light frame from the memory. In various embodiments, in response to the second control signal, the microprocessor may also disable the first hardware timer circuit and the second hardware timer circuit.

In various embodiments, the clock signal generated by the first hardware timer circuit may also be synchronized with the reception signal. For this purpose, the counter of the first hardware timer circuit may be configured to be reset in response to detecting a falling and/or rising edge of the reception signal, as signaled, e.g., by the edge detector or a further edge detector.

Accordingly, the processing system may implement both a CAN FD Light controller/master or a CAN FD Light slave. Specifically, a CAN FD Light controller/master first transmits a transmission CAN FD Light frame and then optionally receives a reception CAN FD Light frame. Conversely, a CAN FD Light slave first receives a reception CAN FD Light frame and then optionally transmits a transmission CAN FD Light frame.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
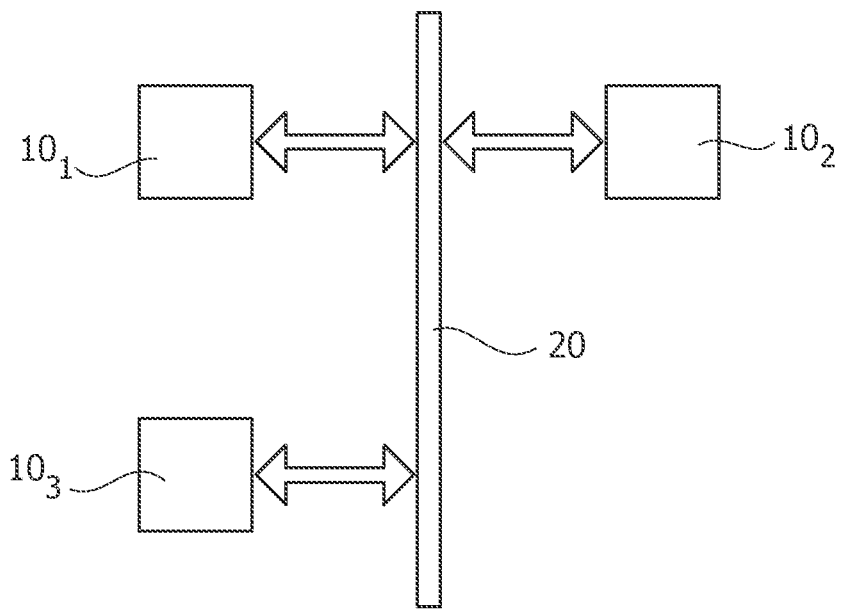
FIG. 1 shows an example of an electronic system comprising a plurality of processing systems.
Figure 2:
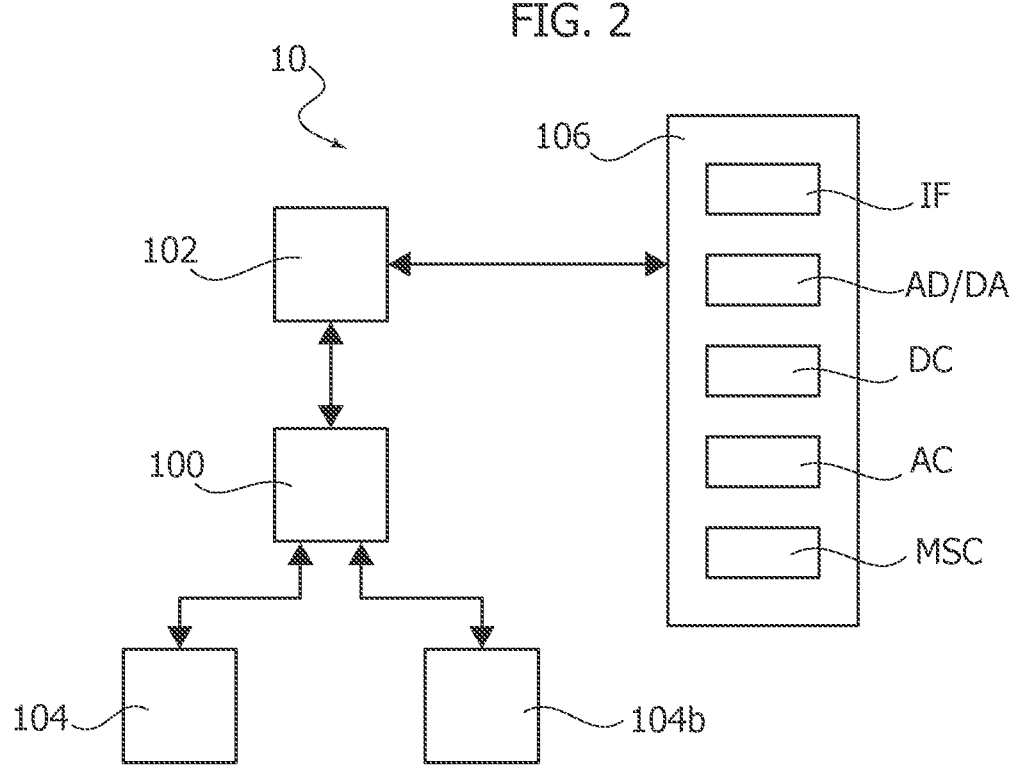
FIG. 2 shows an example of a processing system.
Figure 3:
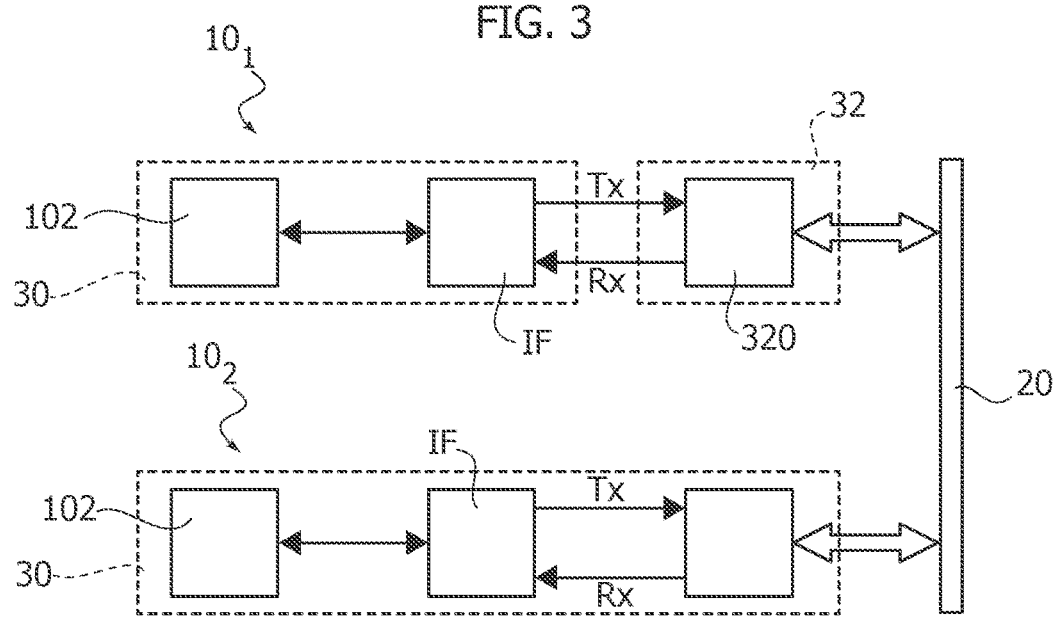
FIG. 3 shows an example of a CAN FD Light communication system.

In the following FIGS. 4 to 17 parts, elements or components which have already been described with reference to FIGS. 1 to 3 are denoted by the same references previously used in such Figure; the description of such previously described elements will not be repeated in the following in order not to overburden the present detailed description.

Figure 4:
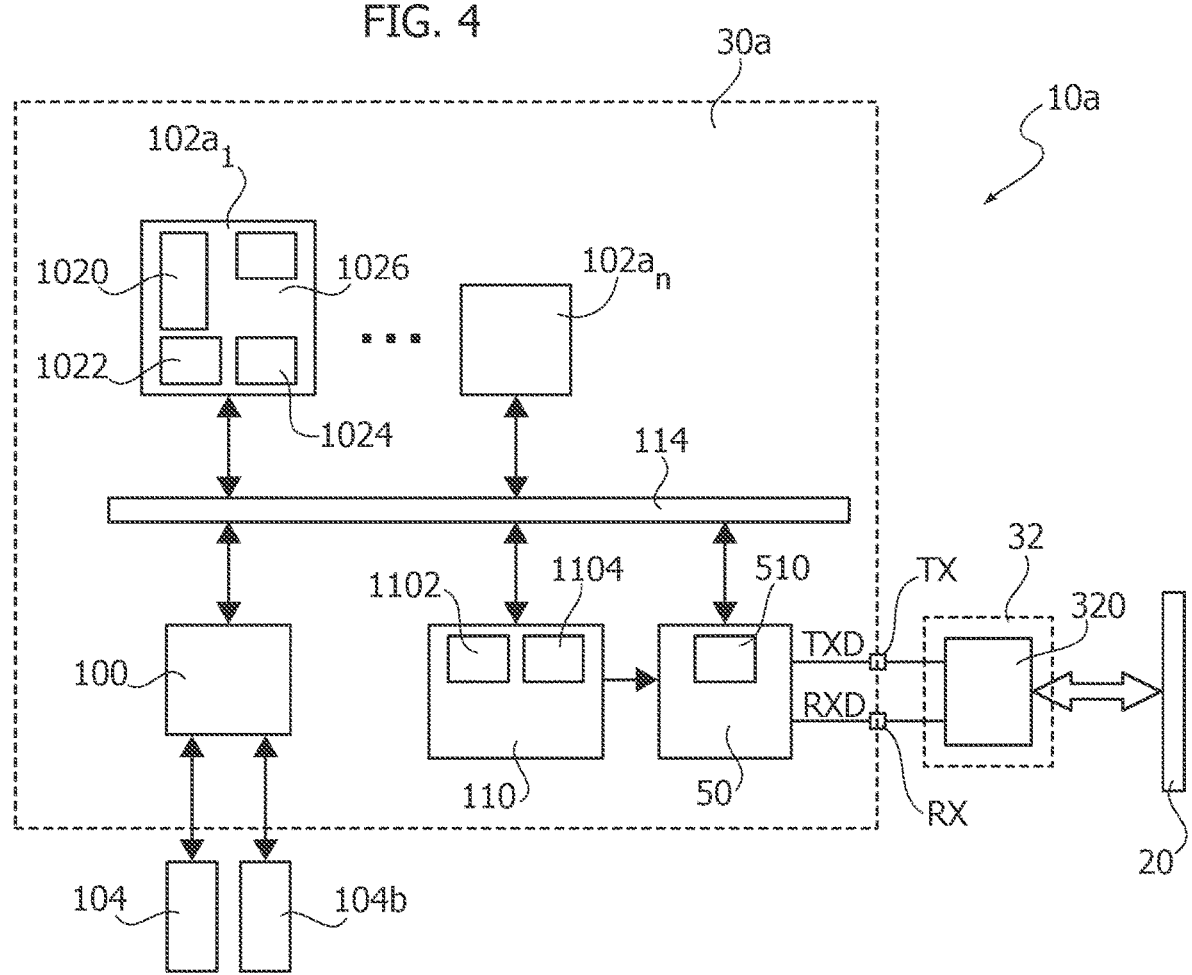
FIG. 4 shows an embodiment of a processing system configured to exchange data via a CAN FD Light bus.

FIG. 4 shows an embodiment of a processing system 10a in accordance with the present description.

Specifically, in the embodiment considered, the processing system 10a comprises at least one processing core 102a, such as n processing cores $102a_1 \ldots 102a_n$, connected to a (on-chip) communication system 114. For example, in the context of real-time control systems, the processing cores $102a_1 \ldots 102a_n$ may be ARM Cortex®-R52 cores. Generally, the communication system 114 may comprise one or more bus systems, e.g., based on the Advanced eXtensible Interface (AXI) bus architecture, and/or a Network-on-Chip (NoC).

For example, as shown at the example of the processing core $102a_1$, each processing core 102a may comprise a microprocessor 1020 and a communication interface 1022 configured to manage the communication between the microprocessor 1020 and the communication system 114. In the embodiment considered, the interface 1022 is a master interface configured to forward a (read or write) request from the microprocessor 1020 to the communication system 114, and forward an optional response from the communication system 114 to the microprocessor 1020. In various embodiments, the processing core 102a may also comprise a slave interface 1024. For example, in this way, a first microprocessor 1020 may send a request to a second microprocessor 1020 (via the communication interface 1022 of the first microprocessor, the communication system 114 and the communication interface 1024 of the second microprocessor). For example, for this purpose the communication system 114 may comprise in addition to a system bus or NoC, also an additional co-processor bus, e.g., connecting the microprocessors 1020 of the same processing core 102a or all processing cores 102a.

In various embodiments, each processing core $102a_1 \ldots 102a_n$ may also comprise further local resources, such as one or more local memories 1026, usually identified as Tightly Coupled Memory (TCM).

As mentioned before, typically the processing cores $102a_1 \ldots 102a_n$ are arranged to exchange data with a non-volatile memory 104 and/or a volatile memory 104b. In various embodiments, these memories are system memories, i.e., shared for the processing cores $102a_1 \ldots 102a_n$. For example, in various embodiments, the processing system 10a comprises one or more memory controllers 100 configured to connect at least one non-volatile memory 104 and at least one volatile memory 104b to the communication system 114. As mentioned before, one or more of the memories 104 and/or 104b may be integrated in an integrated circuit 30a comprising the processing core(s) 102a or may be connected externally to the integrated circuit 30a. For example, the processing system 10a may comprise:

a first volatile memory 104b integrated in the integrated circuit 30a of the processing system 10a and connected to the communication system 114 via a first memory controller 100, and a second volatile memory 104b external with respect to the integrated circuit 30a of the processing system 10a and connected to the communication system 114 via a second memory controller 100.

As mentioned before, the processing system 10a may comprise one or more resources 106, such as one or more communication interfaces or co-processors (e.g., a cryptographic co-processor).

Specifically, in the embodiment considered, the processing system 10a comprises a communication interface 50 connected to the communication system 114 via a slave communication interface 510.

Figure 5:
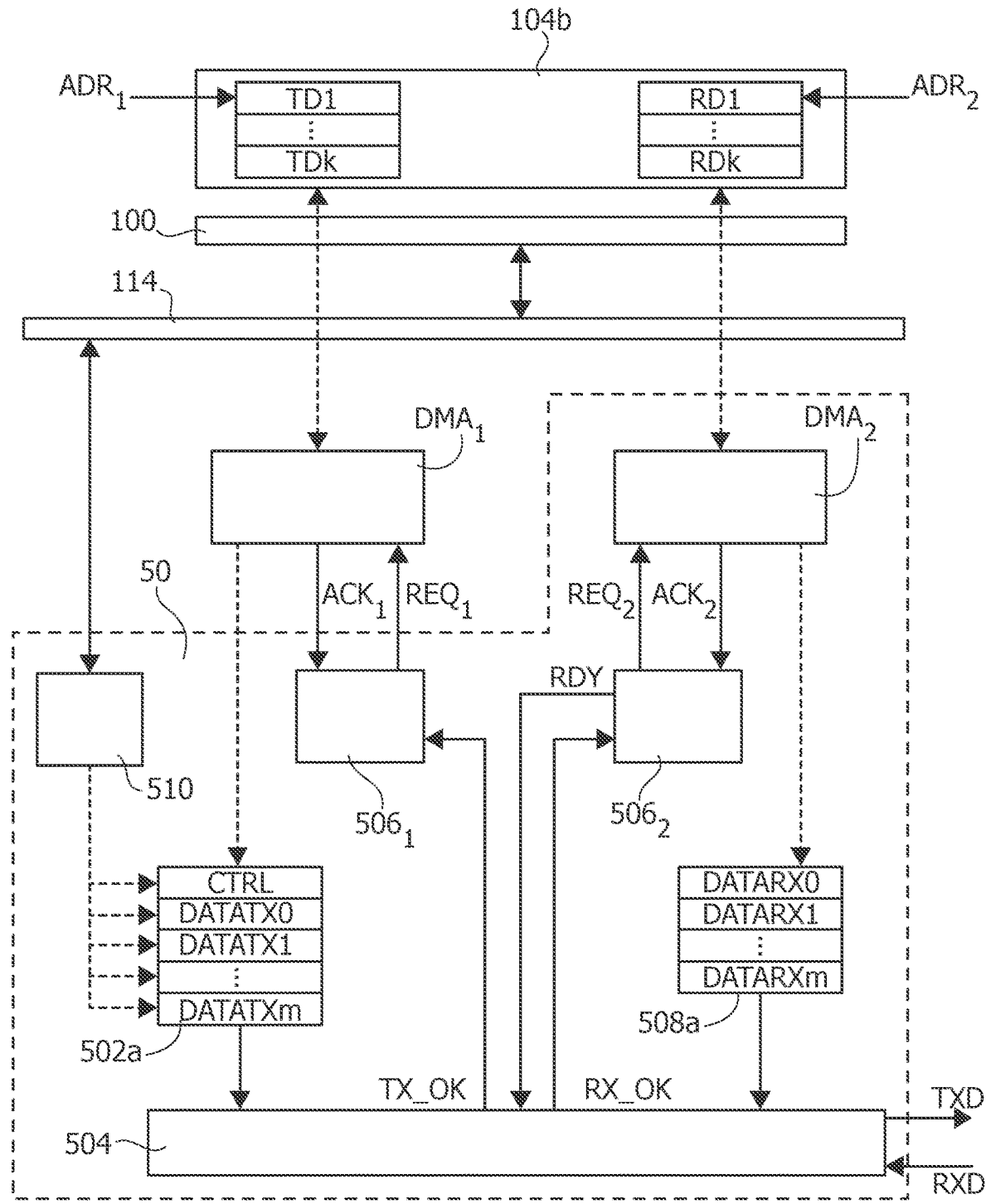
FIG. 5 shows an embodiment of a serial communication interface of the processing system of FIG. 4.

Specifically, as shown in FIG. 5, in various embodiments, the communication interface 50 comprises:

a hardware transmission and reception interface circuit 504 configured to transmit data and receive data;

one or more transmission data registers DATATX for storing data to be transmitted, such as m registers DATATX1 . . . DATATXm;

one or more control registers CTRL for storing control data; and one or more reception data registers DATARX for storing data having been received, such as m registers DATARX1 . . . DATARXm.

In various embodiments, the same registers may be used as transmission data registers DATATX and reception data registers DATARX.

Accordingly, a processing core 102a may be configured to send one or more of the following requests via the communication system 114 to the slave interface 510 of the communication interface 50:

a write request in order to write data to the transmission data register(s) DATATX;

a write request in order to write data to the control register(s) CTRL, e.g., in order to configure the communication interface 50 and/or to start the data transmission operation; and a read request in order to read data from the reception data register(s) DATARX.

For example, in various embodiments, a processing core 102a may write a given number k of data packets TD1 . . . TDk to the m transmission data registers DATATX, or read a given number k of data packets RD1 . . . RDk from the m reception data registers DATARX. Generally, the number k of data packets may correspond to or be smaller than the number m of registers.

For example, for this purpose, each of the registers DATATX, DATARX and CTRL may have associated a respective physical address (PA) of the communication system 114, and each read or write request may comprise a given target address. For example, as mentioned before, the communication system 114 may comprise an Advanced Microcontroller Bus Architecture (AMBA) High-performance Bus (AHB), and an Advanced Peripheral Bus (APB) used to connect the communication interface 50 to the AMBA AHB bus.

In various embodiments, the processing system 10a comprises also one or more Direct-Memory-Access (DMA) controllers 110. Specifically, a DMA controller 110 comprises at least one functional channel connected to a resource 106. For example, as shown in FIG. 5, in this way, the communication interface 50 may be connected to the DMA controller 110 via two channels:

a first channel $DMA_1$ configured to autonomously transfer data from a source address (e.g., associated with a first memory range in the memory 104b) to a target address associated with the transmission data registers DATATX; and a second channel $DMA_2$ configured to transfer data from a source address associated with the reception data registers DATARX to a target address (e.g., associated with a second memory range in the memory 104b).

For example, in various embodiments, the communication interface 50 comprises two DMA interface circuits $506_1$ and $506_2$. Specifically, the first DMA interface circuit $506_1$ is connected to the DMA channel $DMA_1$ and generates a first request signal $REQ_1$ used to request new data to be transmitted. Conversely, the second DMA interface circuit $506_2$ is connected to the DMA channel $DMA_2$ and generates a second request signal $REQ_2$ used to request the reading of the received data.

Generally, the DMA channel $DMA_1$ and/or the DMA channel $DMA_2$ may be implemented with a general-purpose DMA controller, or via an integrated DMA controller, which may be configured to send read or write requests, respectively, either to the communication system 114 or directly the memory controller 110. For example, as schematically shown in FIG. 5, in various embodiments, the DMA channel $DMA_1$ is implemented with a general-purpose DMA channel, which thus transfers data to the registers DATATX via the slave interface 510, while the DMA channel $DMA_2$ is an integrated DMA write channel implemented in the communication interface 50, which thus transfers data directly from the registers DATARX either to the communication system 114 or directly to the memory controller 100.

For example, in various embodiments, a data transmission may be started by writing the content of the control register (s) CTRL, e.g., in order to set a flag enabling the data transmission and/or a flag enabling DMA transfer. Accordingly, in response to the content of the control register(s) CTRL, the DMA interface circuit 5061 may assert the request signal $REQ_1$, whereby the DMA channel $DMA_1$ transfers a given number k of data packets TD1 . . . TDk from the memory 104b to the m transmission data registers DATATX. For example, the source address of the DMA channel $DMA_1$ may be initialized to the address $ADR_1$ of the first memory slot TD1 used to store the transmission data and may be increased for each DMA data transfer. Conversely, the target address may be initialized to the address associated with the first transmission data register DATATX0 and the target address may be increased for each DMA data transfer.

In various embodiments, once having transferred the data packets TD1 . . . TDk to the transmission data registers DATATX, the DMA channel $DMA_1$ may also assert an acknowledge signal $ACK_1$ indicating that the requested number k of packets TD1 . . . TDk has been transferred to the transmission data registers DATATX. For example, the DMA interface circuit $506_1$ may de-assert the request signal $REQ_1$ in response to the acknowledge signal $ACK_1$. Moreover, the hardware communication interface 504 may start the data transmission in response to the acknowledge signal $ACK_1$.

In various embodiments, once having completed the transmission of a requested number of bits via a transmission signal TXD, the hardware communication interface 504 may assert a signal TX_OK. For example, in response to the signal TX_OK, the DMA interface circuit 5061 may assert again the request signal $REQ_1$, thereby requesting new data. Additionally or alternatively, the signal TX_OK may be used to generate an interrupt for a processing core 102a.

Similarly, once having received a given number of bits via a reception signal RXD, the hardware communication interface 504 may assert a signal RX_OK. For example, in this case, the DMA interface circuit $506_2$ may be configured to assert the request signal $REQ_2$, and the DMA channel $DMA_2$ may be configured to transfer k packets from the m reception data registers DATARX to the memory 104b, thereby sequentially storing the received data RD1 . . . RDn to the memory 104b. For example, the source address of the DMA channel $DMA_2$ may be initialized to the address associated with the first reception data register DATARX0 and the source address is increased for each data transfer. Conversely, the target address may be initialized to the address $ADR_2$ of the first memory slot RD1 used to store the received data and may be increased for each data transfer.

In various embodiments, once having transferred the data packets RD1 . . . RDk to the memory 104b, the DMA channel $DMA_2$ may also assert an acknowledge signal $ACK_2$ indicating that the requested number k of packets RD1 . . . RDk has been transferred to the memory 104b. For example, the DMA interface circuit $506_2$ may de-assert the request signal $REQ_2$ in response to the acknowledge signal $ACK_2$. In response to this acknowledge signal $ACK_2$, the DMA interface circuit $506_2$ may assert a ready signal RDY, which is provided to the hardware communication interface 504. Specifically, in this case, the hardware communication interface 504 may be configured to only accept new data when the signal RDY is asserted. Additionally or alternatively, the acknowledge signal $ACK_2$ may be used to generate an interrupt for a processing core 102a.

As shown in FIG. 4, in various embodiments, the DMA controller 110 may thus comprise:

a slave interface 1104 for receiving from the communication system 114 configuration data for configuring the channels of the DMA controller 110, such as the initial source address, the initial target address and the number k of DMA transfers to be executed; and a master interface 1102 for transmitting the read and/or write requests via the communication system 114 (or directly) to the memory controller 100.

Specifically, in various embodiments, the communication interface 50 is a serial communication interface configured to:

generate a NRZ encoded transmission signal TXD, such as a binary bit sequency, as a function of the data stored to the transmission data register(s) DATATX, and sample a NRZ encoded reception signal RXD, such as a binary bit sequency, and store the respective data to the reception data register(s) DATARX.

Specifically, as shown in FIG. 4, in various embodiments, the transmission signal TXD and the reception signal RXD may be connected to a transmission terminal TX and a reception terminal RX, respectively. In various embodiments, the transmission terminal TX and the reception terminal RX are connected to a CAN FD transceiver 320 in order to exchange data via a CAN FD Light bus 20.

Generally, the transmission terminal TX and the reception terminal RX may be pads of the die of the integrated circuit 30a or pins of a packaged integrated circuit 30a, wherein the CAN FD transceiver 320 is provided in a separate integrated circuit 32. Alternatively, the CAN FD transceiver 320 may be integrated in the integrated circuit 30a.

Figure 6:
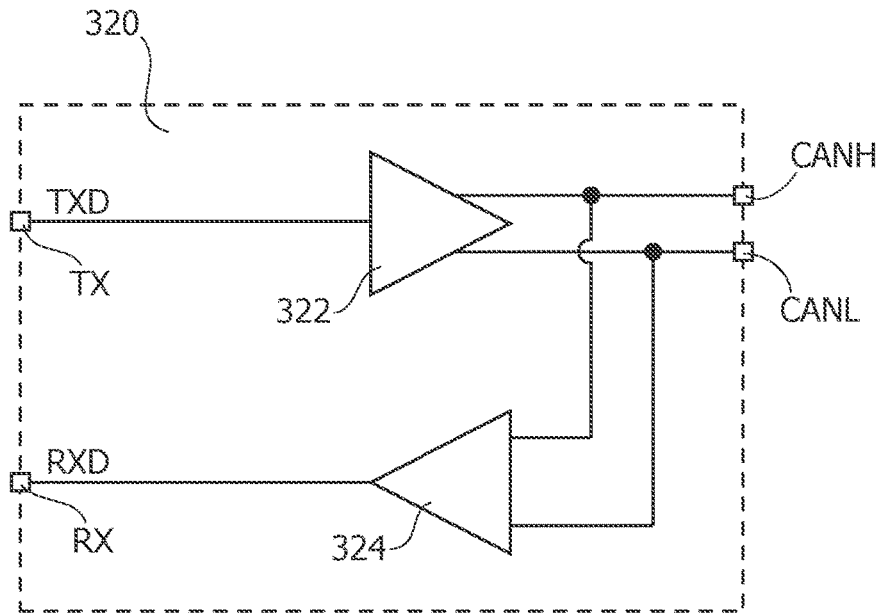
FIG. 6 shows an embodiment of a CAN FD transceiver adapted to be used in the processing system of FIG. 4.

For example, FIG. 6 shows a possible embodiment of a CAN FD transceiver 320.

Specifically, according to the CAN FD standard, the transceiver 320 is configure to receive a NRZ (e.g., NRZ-L) encoded transmission signal TXD, such as a binary bit sequence. In the embodiment considered, the transceiver 320 comprises thus a CAN FD transmitter circuit 322, wherein the transmitter circuit 322 is connected to pins/pads CANH and CANL to be connected to the differential data wires of the CAN FD (Light) bus 20.

The transceiver 320 comprises also a CAN FD receiver circuit 324 configured to generate a signal RXD by analyzing the voltage between the terminals CANH and CANL. Specifically, according to the CAN FD standard, the signal RXD is a NRZ encoded signals, such as binary encoded signals.

Accordingly, a CAN transceiver 320 essentially converts the voltage levels of the signals, while the CAN FD Light protocol management and the respective timing of the signals has to be implemented in the CAN FD Light controller implemented in the processing system 10*a*. Accordingly, in various embodiments, the processing system 10*a* should be able to generate the transmission signal TXD according to the CAN FD Light protocol, and similarly reconstruct a transmitted bit sequence based on the logic level of the received signal RXD.

Thus, before explaining the implementation of the CAN controller with the processing system 10*a*, it is worth to briefly explain the CAN FD Light protocol. Specifically, CAN FD Light is a commander/responder protocol based on the CAN FD protocol. This is described in the reference documents cited previously. Generally, concerning the CAN FD protocol, reference can be made also to documents "*Road vehicles—Controller area network (CAN)—Part 1: Data link layer and physical signaling*", ISO 11898-1:2015 2015, "*Road vehicles—Controller area network (CAN)—Part 2: High-speed medium access unit*", ISO 11898-2:2016 2016, and/or "*RM0407 Reference manual—SPC584Cx/SPC58ECx 32-bit MCU family built on the PowerArchitecture for automotive body electronics applications*", RM0407 Rev. 5, May/2019

Thus, with respect to CAN FD protocol, essentially the CAN FD Light protocol omits the arbitration phase. Accordingly, the commander controls the entire communication and initiates each communication cycle by either sending a frame without expecting an answer from the other network participants ("responders"), such as broadcast frames, or by sending a frame to a dedicated addressed responder while expecting an answer from this responder. i.e., unicast frames in a request and answer scheme. The request frames can also be used to send data to the addressed responder. Only the addressed responder from which an answer is requested is expected to send a frame back, i.e., no other device on the bus is expected to send data at the same time. Accordingly, the sequence of frames on the bus 20 is precisely defined and no arbitration is required. For example, with this scheme, error frames are not required, because the communication direction and the answers are clearly identified. Similarly, also an acknowledge neither from the commander nor from the responders is required. Erroneous frames are dropped and are regarded in the CAN FD Light scheme as not having been received.

Figure 7A:
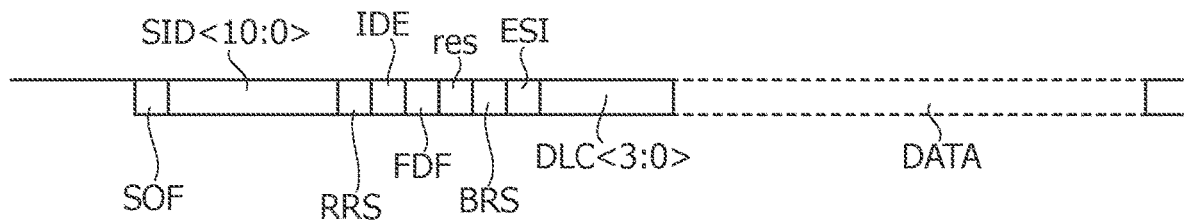
FIGS. 7A and 7B show an example of a CAN FD Light frame.
Figure 7B:
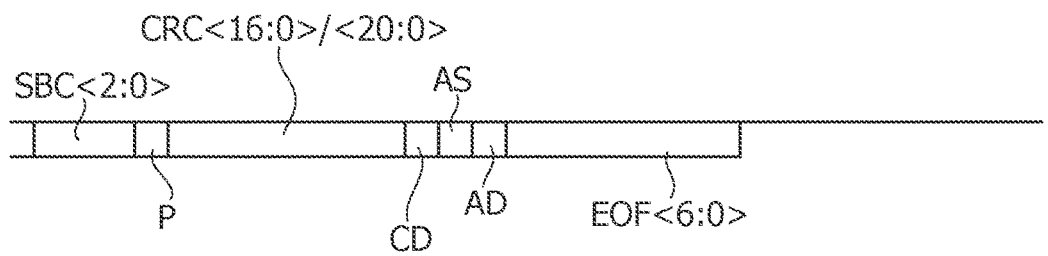

For example, FIGS. 7A and 7B show a typical CAN FD Light frame.

Specifically, the CAN FD Light protocol uses a dominant logic level, which usually corresponds to the low logic level ("0"), and a recessive logic level, which usually corresponds to the high logic level ("1"). The implementation of the logic level of the dominant and recessive logic level depends on the implementation of the CAN FD transceiver 320.

In the embodiments shown in FIGS. 7A and 7B, a CAN FD Light frame comprises, as specified in ISO 11898-1: 2015, in sequence:
 a start-of-frame bit SOF;
 an 11-bit CAN standard identifier SID<10:0>;
 a Remote Request Substitution bit RRS set to the dominant level (e.g., "0");
 an Identifier Extension bit IDE set to the dominant level (e.g., "0");
 a Flexible Data Format bit FDS set to the recessive level (e.g., "1");
 a reserved bit res usually set to the dominant level (e.g., "0");
 a Bit Rate Switch bit BRS set to the dominant level (e.g., "0"), which indicates that the payload is transmitted with the same rate;
 an Error Status Indicator bit ESI set to the dominant level (e.g., "0");
 a 4-bit Data Length Code field DLC <3:0>, which permits to specify the amount of data to be transmitted (values 0x0000 to 0x1000 correspond to 0-8 data bytes, and values 0x1001 to 0x1111 correspond to 12, 16, 20, 24, 32, 48 and 64 data bytes, respectively);
 the payload DATA, which may correspond to 0-8, 12, 16, 20, 24, 32, 48 and 64 data bytes (see the field DLC);
 a 3-bit Stuff Bit Counter field SBC<2:0>;
 an even parity bit P;
 a Cyclic Redundancy Check field CRC having 17 bits (for up to 16 data bytes) or 21 bits (for 20 to 64 data bytes);
 a CRC Delimiter bit CD set to the recessive level (e.g., "1");
 an Acknowledge bit AS;
 an Acknowledge Delimiter bit AD set to the recessive level (e.g., "1"); and
 a 7-bit End-of-Frame field EOF<6:0> having all bits set to the recessive level (e.g., "1").

The inventors have observed that in a CAN FD Light system, the CAN controller may thus prepare the complete frame prior to transmission and then send the bit-sequence of the frame without running an arbitration.

For example, in the embodiment shown in FIGS. 4 and 5, a processing core 102*a* may prepare the complete CAN FD Light frame represented by the transmission data TD1 . . . TDk, and then either:
 write the transmission frame/data TD1 . . . TDk to the transmission data registers DATATX, or
 write the transmission frame/data TD1 . . . TDk to memory 104*a*, and then activate the DMA transfer, whereby the DMA channel $DMA_1$ transfers the transmission frame TD1 . . . TDk from the memory 104*b* to the transmission data registers DATATX.

Figure 12:
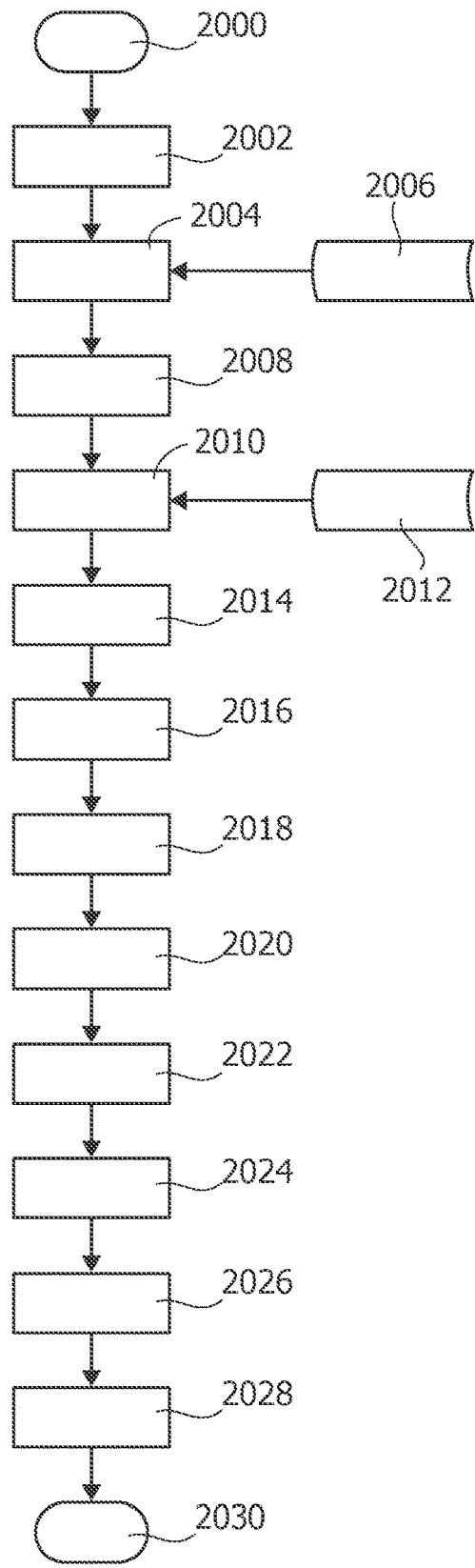
FIG. 12 shows an embodiment of the operation of a microprocessor of the processing system of FIG. 4 in order to transmit data.

FIG. 12 shows in this respect an embodiment of the operation, e.g., implemented via software instructions, of the processing core 102*a* in order to transmit data.

Specifically, at a start step 2000, the processing core 102*a* decides to transmit given data via the communication interface 50/the CAN FD Light bus 20, thus starting the generation of the transmission frame/data TD1 . . . TDk.

At a step 2002, the processing core 102*a* sets at a step 2004 the start-of-frame bit SOF to the dominant level. As will be described later on, this step is purely optional.

Next, the processing core 102*a* obtains a standard identifier at a step 2006 and adds at a step 2004 the respective standard identifier to the field SID of the transmission frame TD1 . . . TDk.

Next, the processing core 102*a* adds at a step 2008 predefined CAN FD Light control bits to the transmission frame TD1 ... TDk. The control bits include the bits RRS, IDE, FDF, BRS, and ESI, which may have fixed levels for a CAN FD Light frame.

Next, the processing core 102a obtains at a step 2012 the data to be transmitted, determines at a step 2010 the corresponding data length code (DLC) and adds at a step 2014 the data length code to the field DLC and the data to be transmitted to the field DATA of the transmission frame TD1 ... TDk.

At a step 2016, the processing core 102a adds then possible stuff bits according to the bit stuff rule of the CAN FD Light standard ISO 11898-1:2015, and calculates at a step 2018 the respective stuff bit count and adds the stuff bit count to the field SBC of the transmission frame TD1 ... TDk. Similarly, the processing core 102a may determine the value of the parity bit and add the parity bit to the field P of the transmission frame TD1 ... TDk.

At a step 2020, the processing core 102a determines then the respective number of CRC bits and adds the CRC bits to the field CRC of the transmission frame TD1 ... TDk. Generally, fixed stuff bits according to ISO 11898-1:2015 may also be added in this step.

Finally, the processing core 102a adds at a step 2022 the trailing bits for the acknowledge fields AS and AD, and the end-of-frame delimiter EOF.

Accordingly, based on the content of the transmission frame, or only the length of the variable length fields, the processing core 102a may determine at a step 2024 the frame length and store data identifying the frame length to the control register CTRL of the communication interface 50.

Moreover, the processing core 102a may store at a step 2026 the transmission frame/data TD1 ... TDk to the transmission data registers DATATX, or to the memory 104b and activate the DMA transfer of the DMA channel $DMA_1$.

Finally, the processing core 102a may activate at a step 2028 the data transmission operation, e.g., by setting a respective bit in the control register CTRL, and the procedure terminates at a step 2030.

Generally, the programming operations of the control register CTRL at the steps 2024, 2026 and 2028 may also be combined by performing only a single programming of the control register CTRL.

Generally, in order to determine that the transmission of the transmission frame/data TD1 ... TDk has been completed, the processing core 102a may monitor a flag in the control register CTRL and/or receive an interrupt from the communication interface 50 (e.g., both set in response to the signal TX_OK).

Figure 13:
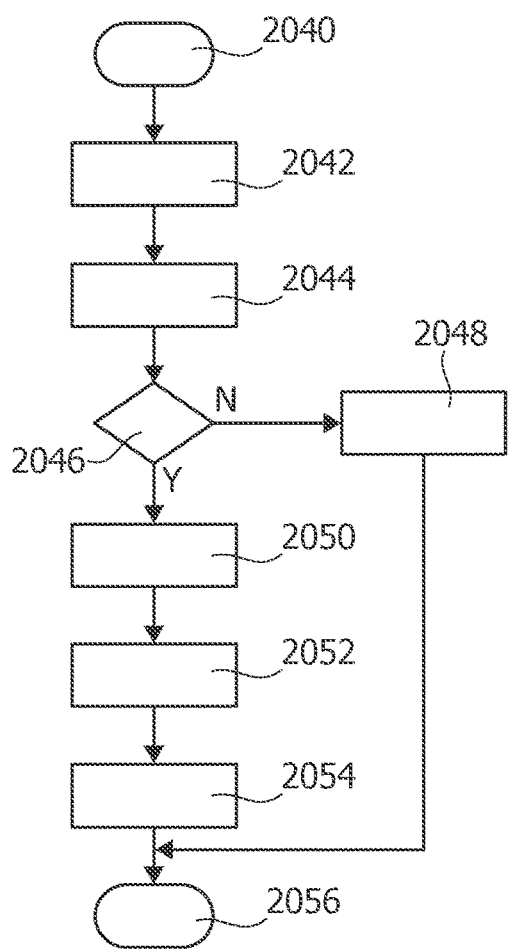
FIG. 13 shows an embodiment of the operation of a microprocessor of the processing system of FIG. 4 in order to received data.

FIG. 13 shows in this respect an embodiment of the operation, e.g., implemented via software instructions, of the processing core 102a in order to receive data.

Specifically, once a new frame RD1 ... RDk has been received by the communication interface 50 at a start step 2040, the processing core 102a may read at a step 2042 the received frame/data RD1 ... RDk. For example, in order to start the procedure, the processing core 102a may monitor a flag in the control register CTRL and/or receive an interrupt from the communication interface 50. In this respect, the flag and/or interrupt may be asserted when the communication interface 50 stores the data to the reception data registers DATARX (e.g., as indicated by the signal RX_OK) and/or once having transferred the data RD1 ... RDk to the memory 104b via the DMA channel $DMA_2$ (e.g., as indicated by the signal $ACK_2$). Accordingly, at the step 2042, the processing core 102a may read the received frame/data RD1 ... RDk form the reception data registers DATARX or the memory 104b. Accordingly, in various embodiments, prior to receiving data, the processing core 102a may activate the DMA transfer of the DMA channel $DMA_2$, whereby the DMA channel $DMA_2$ transfers the received frame from the reception data registers DATARX to the memory 104b.

At a step 2044, the processing core 102a may then calculate the CRC data for the received frame/data RD1 ... RDk, and may compare at a step 2046 the received CRC data (field CRC, e.g., after removal of the fixed stuff bits according ISO 11898-1:2015) with the calculated CRC data.

In case the received CRC data do not correspond to the calculated CRC data (output "N" of the verification step 2046), the processing core 102a may disregard/drop the received data at a step 2048, and the procedure terminates at a stop step 2056.

Conversely, in case the received CRC data do correspond to the calculated CRC data (output "Y" of the verification step 2046), the processing core 102a removes at a step 2050 possible stuff bits.

At a step 2052, the processing core 102a may then obtain the standard identifier SID.

Finally, at a step 2054, the processing core 102a may extract the data from the received frame/data RD1 ... RDk. Generally, in order to determine the length of the data field DATA (and thus the length of the CRC field), the processing core 102a may extract the data length code DLC and/or may determine the number of bits received. Accordingly, at the step 2054, the processing core 102a has obtained the identifier SID and the respective data DATA, and the procedure terminates at the step 2056.

Accordingly, in this case, the transmission portion of the hardware serial communication interface 504 may be configured to transfer a given number of bits corresponding to the length of the transmission frame stored to the transmission data registers DATATX according to the timing of the CAN FD Light standard. Similarly, the reception portion of the hardware serial communication interface 504 should be configured to receive the reception frame according to the timing of the CAN FD Light standard and store the frame to the reception data registers DATARX. However, in this case, in order to determine the length of the reception frame, the reception portion should also be configured to detect the End-of-Frame field EOF<6:0> having all bits set to the recessive level (e.g., "1"). Specifically, in various embodiments, due to the fact that the Acknowledge Delimiter bit AD should be set to the recessive level, the reception portion is configured to determine the end of the frame by detecting eight consecutive bits being set to the recessive level.

Figure 8:
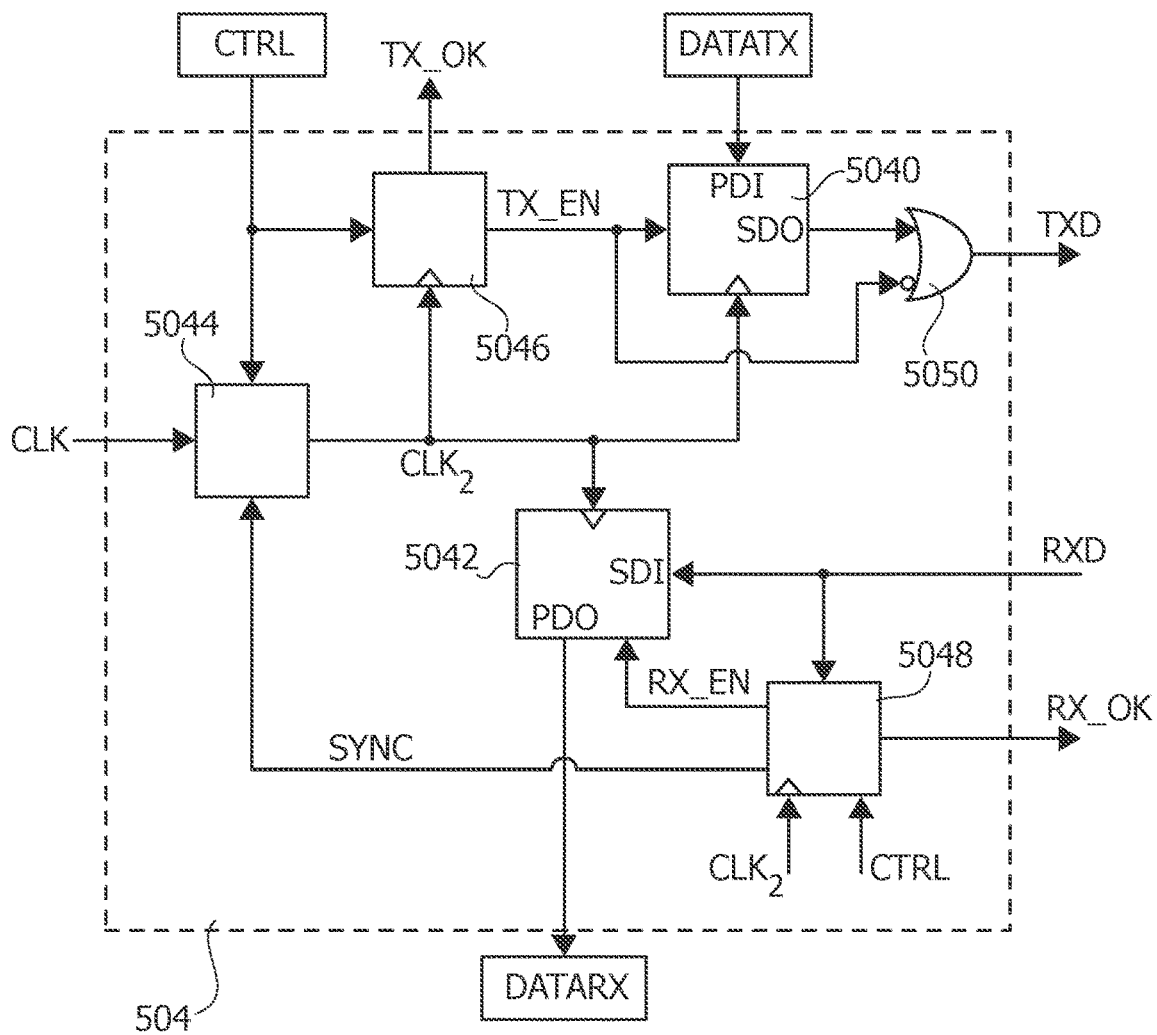
FIG. 8 shows an embodiment of a hardware transmission and reception circuit of the serial communication interface of FIG. 5.

FIG. 8 shows an embodiment of the hardware serial communication interface 504.

Specifically, in the embodiment considered, the hardware communication interface 504 comprises two shift registers 5040 and 5042. Specifically, in the embodiment considered, the shift register 5040 is used to store the data to be transmitted.

In this respect, the inventors have observed that a CAN FD Light frame as shown in FIGS. 7A and 7B includes a single start-of-frame bit SOF (set to the dominant level) and seven end-of-frame bits EOF (set to the recessive level). Moreover, a CAN FD Light frame may comprise up to 675 bits. Specifically, the CAN FD Light comprises a fixed number of 35 bits comprising 22 bits of control fields SOF, ID, RRS, IDE, FDF, res, BRS, ESI and DLC, 4 bits for the stuff bit counter field SBC and the parity bit P, 2 bits for the acknowledge fields AS and AD, and 7 bits for end-of-frame field EOF. In addition to these 35 fixed bits, a number of variable bits may be added, i.e., the data field DATA and the field CRC. The length of the data field DATA is indicated by the content of the data length code DLC. The value DLC also determines the number of bits of the CRC field, i.e., either 17 or 21 bits. Moreover, depending on the content of the frame, additional stuff bits are added according to the bit stuffing rule described in ISO 11898-1. Accordingly, while the number of bits of a frame may be variable, the number of bits is known prior to starting the data transmission operation.

Accordingly, once the processing core 102a has generated the data of the transmission frame TD1 . . . TDk, the processing core 102a may also determine the number of bits to be transmitted. Specifically, in various embodiments, the processing core 102a is configured to write data to the control register CTRL, which identify the number of bits to be transmitted.

Accordingly, once a data transmission is requested, the hardware communication interface 504 may transfer the content of the transmission data registers DATATX to the shift register 5040, e.g., by using a parallel data input PDI of the shift register 5040. For this purpose, the transmission data register DATATX and the shift-register 5040 have preferably the same dimension and are configured to store at least 675 bits.

Generally, the transmission frame stored to the transmission data register DATATX may also not comprise the start-of-frame bit SOF. For example, in this case, a first bit of the shift-register 5040 may be set to "0", while the other bits of the shift-register 5040 are mapped to respective bits of the transmission data register DATATX.

Moreover, in various embodiments, the data register DATATX and the shift-register 5040 may be implemented with the same shift-register, which may be written, e.g., via the slave interface 510 and/or the DMA channel $DMA_1$. Also in this case, an additional bit may be used to store the start-of-frame bit SOF.

Thus, in general, the processing core 102a prepares a CAN FD Light frame (with or without the start-of-frame bit SOF), and the CAN FD Light frame is transferred (via the processing core 102a and/or the DMA channel $DMA_1$) to the shift register 5040, which optionally may add the start-of-frame bits SOF.

In various embodiments, the shift register 5040 is configured to sequentially transmit the bits stored to the shift register 5040 as a function of a clock signal $CLK_2$ and a transmission enable signal TX_EN.

Specifically, in the embodiment considered, the hardware communication interface 504 comprises also a clock management circuit 5044 configured to generate the clock signal $CLK_2$ for the hardware communication interface 504 in response to a system clock signal CLK of the processing system 10a.

Figure 9:
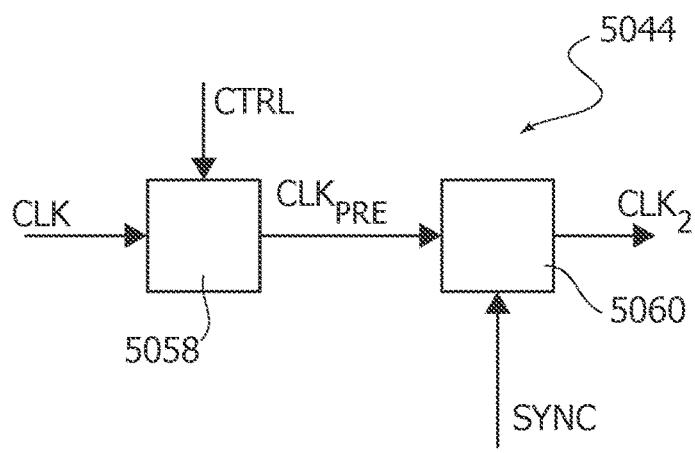
FIG. 9 shows an embodiment of a clock management circuit of the hardware transmission and reception circuit of FIG. 8.

For example, as shown in FIG. 9, in various embodiments, the clock management circuit may comprise a clock pre-scaling circuit 5058 configured to generate a pre-scaled clock signal $CLK_{PKE}$ having a reduced frequency with respect to the frequency of the clock signal CLK, wherein the scaling factor may be programmable as a function of the configuration data stored to the control register(s) CTRL. For example, the pre-scaling circuit 5058 may be implemented with a counter configured to increase a count value in response to the clock signal CLK, wherein the counter changes the logic level of the clock signal $CLK_{PKE}$ when the count value reaches a threshold value, wherein the threshold value is determined as a function of the configuration data provided by the control register(s) CTRL.

In the embodiment considered, the pre-scaled clock signal $CLK_{PRE}$ is then provided to a further down-scaling circuit 5060 configured to generate the clock signal $CLK_2$ having a reduce frequency with respect to the frequency of the clock signal $CLK_{PRE}$, wherein the scaling factor may be fixed or programmable as a function of the configuration data stored to the control register(s) CTRL. For example, the down-scaling circuit 5060 may be implemented with a counter configured to increase a count value in response to the clock signal $CLK_{PRE}$, wherein the counter changes the logic level of the clock signal $CLK_{PRE}$ when the count value reaches a threshold value, wherein the threshold value is optionally determined as a function of the configuration data provided by the configuration register(s) CTRL.

As shown in FIG. 9, in various embodiments, the operation of the down-scaling circuit 5060 is changed in response to a synchronization signal SYNC, which is however only used when receiving data and will be described later on.

Accordingly, when transmitting data, the clock signal $CLK_2$ corresponds to a downscaled version of the clock signal CLK (as a function of the configuration data stored to the control register CTRL), and may have, e.g., 1 MHz or another frequency supported by CAN FD Light.

As mentioned before, the shift register 5040 also receives an enable signal TX_EN, which enables the data transmission operation. Specifically, in the embodiment considered, the shift register 5040 is configured to, when the enable signal TX_EN is asserted and in response to the clock signal $CLK_2$, sequentially provide at a serial data output SDO the content of the shift-register 5040. Accordingly, when the enable signal TX_EN is asserted, the shift register 5040 sequentially provides the bits of the data stored to the shift register 5040 (starting from the start-of-frame bit SOF).

In the embodiment considered, the enable signal TX_EN is generated by a transmission control circuit 5046 configured to determine whether a given number of requested bits has been transmitted. Accordingly, in various embodiments, the transmission control circuit 5046 is configured to determine the number of requests bits to be transmitted as a function of the configuration data stored to the control register(s) CTRL. For example, the configuration data stored to the control register(s) CTRL may correspond to the total number of bits to be transmitted (with or without the start-of-frame bit SOF).

For example, in various embodiments, the transmission control circuit 5046 may comprise a counter, which is increased in response to the clock signal $CLK_2$, thereby indicating the number of transmitted bits. Accordingly, the counter may be reset when starting a new data transmission operation, thereby asserting the enable signal TX_EN, and the transmission control circuit 5046 de-asserts the enable signal TX_EN when the requested number of bits has been transmitted. For example, in this case, transmission control circuit may assert the control signal TX_OK when the transmission control circuit 5046 de-asserts the enable signal TX_EN.

In various embodiments, the hardware communication interface 504 comprises a combinational logic circuit 5050 configured to set the signal TXD to the recessive level, e.g., high, when the enable signal TX_EN is de-asserted. For example, in case the enable signal TX_EN is set to low when the enable signal TX_EN is de-asserted, the combinational logic circuit 5050 may be implemented with a logic OR gate receiving at input the serial data output signal SDO of the shift register 5056 and the inverted version of the enable signal TX_EN, and providing at output the signal TXD.

The combinational logic circuit 5050 is purely optional, because the serial data output signal SDO may also be set to the recessive level, when the enable signal TX_EN is de-asserted, e.g., because the end-of-frame bits EOF are already set to the recessive level.

Conversely, the shift register 5042 is configured to store the bits received via the signal RXD.

Specifically, when no data transmission occurs, the reception signal RXD is set to the recessive level, e.g., high. Once a transmission is started by another device, the start-of-frame bits SOF is transmitted, whereby the reception signal RXD is set to the dominant level, e.g., low.

Accordingly, in various embodiments, the hardware communication interface 504 comprises a reception control circuit 5048. Specifically, the reception control circuit 5048 is configured to assert a reception enable signal RX_EN in response to a change of the signal RXD from the recessive level to the dominant level, e.g., in response to a falling edge of the signal RXD.

Generally, as mentioned before, the start-of-frame bit SOF may be followed by a variable number of bits (up to 675 bits). However, the end-of-frame condition is precisely determined by a sequence of 8 bits being set to the recessive level, e.g., high, which correspond to the bit AD and the end-of-frame field EOF. In fact, the bit stuffing of the CAN FD Light protocol guarantees a change of the logic level of the other data at most after a sequence of five bits having the same logic level.

Accordingly, in various embodiments, the reception control circuit 5048 is configured to de-assert a reception enable signal RX_EN in response to determining that eight consecutive bits are set to the recessive level. For example, for this purpose, the reception control circuit 5048 may comprise a counter configured to increase a count value in response to the clock signal $CLK_2$, wherein the counter is reset when the signal RXD is set to the dominant level. Accordingly, in this case, the reception control circuit 5048 may de-assert the reception enable signal RX_EN when the counter reaches 8.

Accordingly, in various embodiments, the shift register 5042 is configured to, when the enable signal RX_EN is asserted and in response to the clock signal $CLK_2$, sequentially add to the data stored to the shift register 5042 the logic level applied to a serial data input SDI of the shift register 5042, wherein the serial data input SDI is connected to the reception signal RXD. Generally, the reception control circuit 5048 may assert the reception enable signal RX_EN with the start-of-frame bit SOF or only for the next bit, whereby the start-of-frame bit SOF is stored or not stored to the shift register 5042.

Accordingly, once eight consecutive recessive bits have been received, the reception control circuit 5048 de-asserts the reception enable signal RX_EN. The reception control circuit 5048 may also assert the control signal RX_OK in this case.

Moreover, once the eight consecutive recessive bits have been received, e.g., in response to the signal RX_OK, the hardware communication interface 504 transfers the content of the shift register 5042 to the reception data register DATARX, e.g., by using a parallel data output PDO of the shift register 5042. For this purpose, the reception data register DATARX and the shift-register 5042 have preferably the same dimension and are configured to store at least 675 bits. As mentioned before, the reception frame transferred to the reception data register DATARX may also not comprise the start-of-frame bit SOF.

Figure 10:
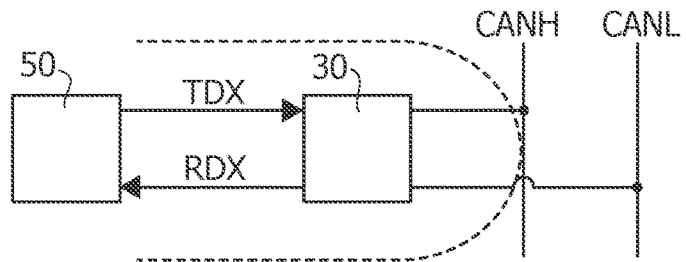
FIG. 10 shows an embodiment of the operation of the hardware transmission and reception circuit of FIG. 8.

As shown in FIG. 10, when transmitting data via a CAN FD transceiver 320, indeed the reception signal RXD corresponds to a feedback of the transmission signal TXD.

Accordingly, this permits to implement an additional monitoring feature for the transmitted frame, i.e., the received frame may be compared with the transmitted frame. For example, this can be used as a security feature, because a processing core 102a may verify whether another circuit has modified the data transmitted on the CAN bus 20.

Alternatively, in various embodiments, the reception control circuit 5048 may be configured to maintain the reception enable signal RX_EN de-asserted when the transmission of data is enabled, e.g., in response to the configuration data stored to the control register(s) CTRL and/or the transmission enable signal TX_EN. In various embodiments, this behavior may also be programmable.

Accordingly, in the embodiments considered, the transmission of data occurs in response to the clock signal $CLK_2$, and the data are shifted out synchronously with this clock $CLK_2$. Conversely, the data received via the reception signal RXD may have a phase and/or a frequency deviation from this clock $CLK_2$. Substantially, a frequency deviation leads to accumulated phase shifts, i.e., a frequency deviation can be viewed as a sequence of phase shifts. In various embodiments, to compensate phase shifts the reception control circuit 5048 may be configured to adjust the sampling point of the received data based on detected bit transitions. Specifically, in various embodiments, is used for this purpose the synchronization signal SYNC.

Specifically, in various embodiments, the reception control circuit 5048 is configured to assert the synchronization signal SYNC in response to detecting a change of the logic level of the reception signal RXD, i.e., from the recessive level to the dominant level, e.g., in response to a falling edge, and/or from the dominant level to the recessive level, e.g., in response to a rising edge. For example, for this purpose, the reception control circuit 5048 may sample the reception signal RXD in response to the clock signal $CLK_{PRE}$ and assert the synchronization signal SYNC when a current sample is set to the dominant level and the previous sample is set to the recessive level and/or when a current sample is set to the recessive level and the previous sample is set to the dominant level.

As mentioned with respect to FIG. 9, the down-scaling circuit 5060 may be synchronized with the synchronization signal SYNC in order to generate the edge used to sample the reception signal RXD.

For example, in various embodiments, the down-scaling circuit 5060 is implemented with a counter configured to increase a count value CNT, and reset the count value CNT when a maximum count value is reached. Moreover, in order to synchronize the count value CNT with the synchronization signal SYNC, the counter CNT may be reset in response to determining that the synchronization signal SYNC is asserted.

Figure 11A:
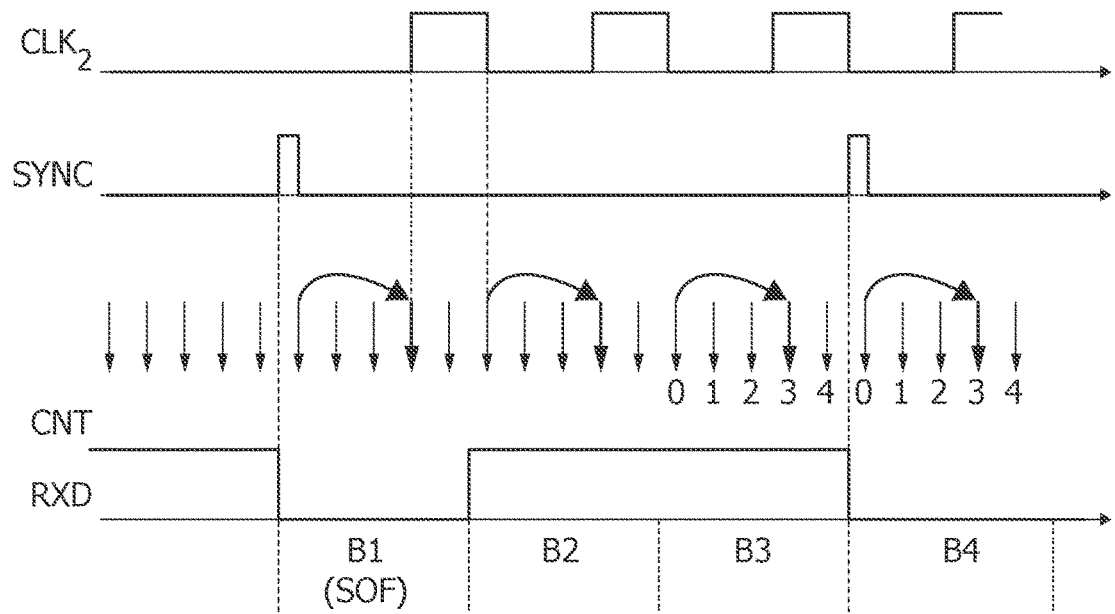
FIGS. 11A and 11B show embodiments of the operation of the hardware transmission and reception circuit of FIG. 8.

For example, this is shown in FIG. 11A for the exemplary case that the dominant logic level is low and the receiver is synchronized only with the falling edge of the signal RXD. Specifically, in the example considered, the reception signal RX comprises in sequence the bits B1="0" (e.g., corresponding to the start-of-frame bis SOF), B1="1", B3="1" and B4="0".

Accordantly, in response to the change of the reception signal RXD from high to low for the bit B1, the synchronization signal SYNC is asserted, and thus the count value CNT is reset. Next the count value is increased at each clock cycle of the clock signal $CLK_{PRE}$, e.g., until a maximum value, e.g., 4, is reached, and then the count value CNT is again reset by the counter. Accordingly, in the embodiment considered, while sampling the recessive level, the count value CNT is not reset via the synchronization signal SYNC but only via the counter.

Accordingly, the clock signal $CLK_2$ may be asserted when the count value CNT reaches a given first value, such as 3, and may be de-asserted when the count value CNT reaches a given first value, such as 0.

Figure 11B:
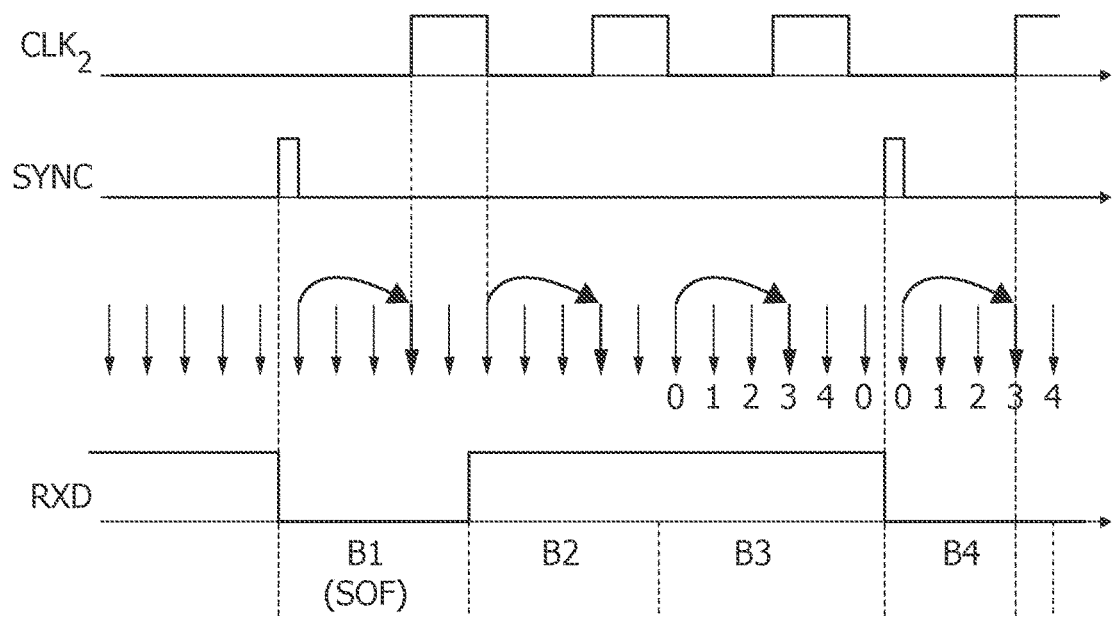

In this respect, FIG. 11B shows the case when the frequency of the reception signal RXD is slightly higher than the frequency of the clock signal $CLK_2$.

Specifically, at the end of the bit B3, the count value reaches the maximum value, e.g., 4, and the counter resets the count value to 0. However, then is received a falling edge, whereby the reception control circuit 5048 asserts the synchronization signal SYNC, whereby the counter CNT is again reset. Accordingly, in this case, the time between the falling edge and the next rising edge of the clock signal $CLK_2$ corresponds to four cycles, instead of the usual three cycles.

Generally, instead of resetting the counter 5060, the logic level of the synchronization signal SYNC may be used to determine the increase value of the counter. For example, by default the increase value may be set to 1. Conversely, when the signal SYNC is asserted when the count value is set to 0, the increase value of the counter may be set to zero, whereby the phase "0" is repeated twice. Conversely, when the signal SYNC is asserted when the count value has its maximum value minus 1 (e.g., 3), the increase value of the counter may be set to two, whereby the counter is reset indirectly.

In this respect, the inventors have observed, that such a resynchronization of the clock signal $CLK_2$ is particularly useful in case of the CAN FD Light protocol, because a significant number of bits may be transmitted.

Specifically, in various embodiments, the synchronization signal SYNC is generated in response to transitions of the reception signal RXD from the recessive level to the dominant level (such as a falling edge), but not in response to transitions from the dominant level to the recessive level (such as a rising edge). In fact, the inventors have observed, that the latter transitions may not be used always, because the transition is usually not very well defined due to the properties of the CAN bus physical layer. Specifically, when using a standard CAN physical layer according to ISO 11898-2 the dominant value (representing logical "0" on the CAN bus) is strongly driven by the CAN transceiver, while the recessive value is determined by the termination resistors (2×120 Ohms in parallel, i.e., 60 Ohms). Therefore, the dominant to recessive edge is not well driven and may be subject to ringing.

Moreover, in this respect is also relevant the bit-stuffing mechanism, which is not only relevant for determining the end-of-frame field EOF, but also ensures that a resynchronization is performed within a given maximum number of bits. Specifically, the bit stuffing ensures an edge after at most five bits and therefore at most after ten bits a falling edge occurs, which thus permits a resynchronization of the clock signal $CLK_2$.

Accordingly, the communication interface 50 may be used for both as transmitter of a CAN FD light frame and as a receiver of a CAN FD Light frame.

In this respect, in case of a CAN FD Light controller, i.e., a CAN FD Light master circuit, the processing core 102a provides first (via the slave interface 510 and/or the DMA channel $DMA_1$) a CAN FD Light frame to the hardware transceiver 504 (see the description of FIG. 12). In case the CAN FD Light frame includes a request expecting a response, the hardware transceiver 504 will then provide (via the slave interface 510 and/or the DMA channel $DMA_1$) a received CAN FD Light frame to the processing core 102a (see the description of FIG. 13).

Conversely, in case of a CAN FD Light slave circuit, the hardware transceiver 504 will provide first (via the slave interface 510 and/or the DMA channel $DMA_1$) a received CAN FD Light frame to the processing core 102a (see the description of FIG. 13). In case, the received CAN FD Light frame correspond to a request expecting a response, the processing core 102a may then provide (via the slave interface 510 and/or the DMA channel $DMA_1$) a response CAN FD Light frame to the hardware transceiver 504 (see the description of FIG. 12).

The inventors have observed that modern processing systems often comprise a Serial Peripheral Interface (SPI). In this respect, the inventors have observed that such a SPI interface may be used to transmit and receive the CAN FD Light frames. Accordingly, in this case, the communication interface 50 comprises a SPI interface.

Figure 14:
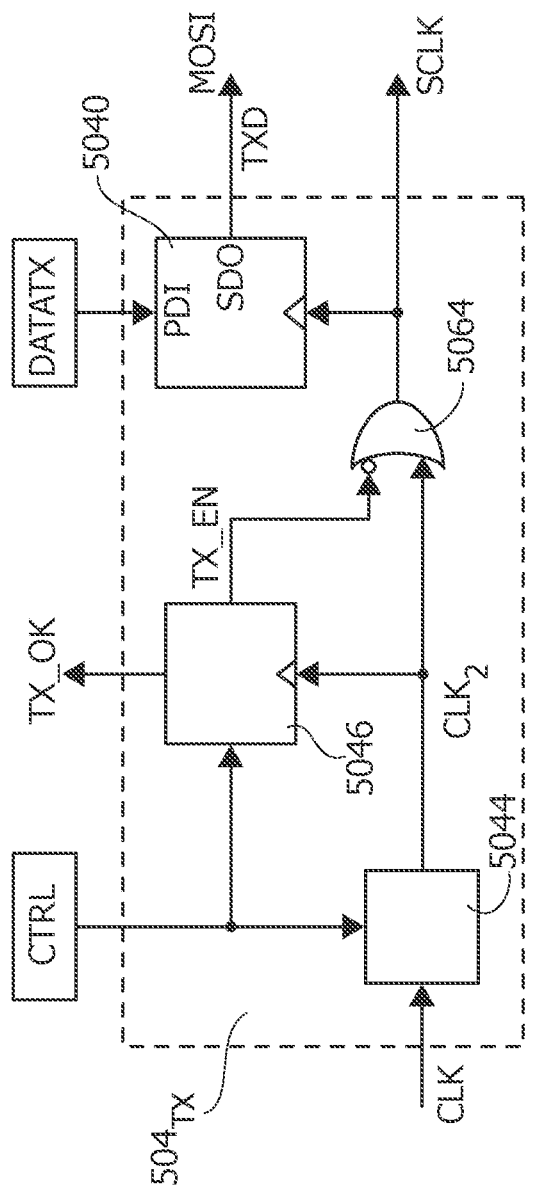
FIG. 14 shows an example of the transmission portion of a hardware SPI interface.

For example, as shown in FIG. 14, the transmission portion $504_{TX}$ of a hardware SPI interface is configured to generate a serial data signal MOSI (Master Out Slave In) and a synchronous clock signal SCLK.

Moreover, usually the transmission circuit $504_{TX}$ comprises a clock down-scaling circuit 5044 configured to generate the clock signal SCLK by downscaling a clock signal CLK of the processing system 10a as a function of the configuration data stored to one or more control registers CTRL.

Moreover, the transmission circuit $504_{TX}$ comprises a shift register 5040 to which a processing core 102a may transfer data to be transmitted and which is configured (when enabled via a transmission enable signal TX_EN provided by a transmission control circuit 5046) to sequentially provide the content of the shift register 5040 to a serial data output SDO in response to the clock signal SCLK, wherein the serial data output SDO provides the signal MOSI.

Accordingly, even though a SPI interface is a synchronous communication interface, the SPI interface may be used as an asynchronous transmission interface by only providing the signal MOSI as signal TXD to the CAN FD transceiver 320. For possible embodiments of the transmission control circuit 5046 and clock down-scale circuits may be made reference to the previous description of FIG. 8.

Accordingly, in order to implement the transmission portion of the CAN FD Light frame stored TD1 . . . TDk, the clock down-scaling circuit 5044 should be able to generate clock frequencies being compatible with the CAN FD specification, such as, for example, a clock signal SCLK/ $CLK_2$ of 1 Mhz.

Usually the shift register 5040 of a SPI interface has only a given word-size, such as 8 or 16 bits, which is insufficient to store a complete CAN FD Light frame. However, the inventors have observed that by using an SPI interface with a transmission data register DATATX and DMA transfer, the DMA channel $DMA_1$ is able to transfer a given data word of the transmission data TD1 . . . TDk from the memory 104b to the transmission data register DATATX, which is then transmitted via the transmission circuit $504_{TX}$. Moreover, while the transmission circuit $504_{TX}$ sequential transmits the bits of the current data word, the DMA channel $DMA_1$ may transfer a new data word of the transmission data TD1 . . . TDk from the memory 104b to the transmission data register DATATX.

Accordingly, by using an SPI interface 50 supporting a DMA channel $DMA_1$ for the data to be transmitted, it is sufficient to correctly configure the DMA channel (such as an integrated or a general-purpose DMA channel) and the SPI interface 50 in order to transmit all data words of the transmission data TD1 . . . TDk comprising the CAN FD Light frame prepared by the processing core 102a.

In this respect, the inventors have observed that the CAN FD Light frame stored to the transmission data TD1 . . . TDk should be configured in a specific manner.

Figure 15:
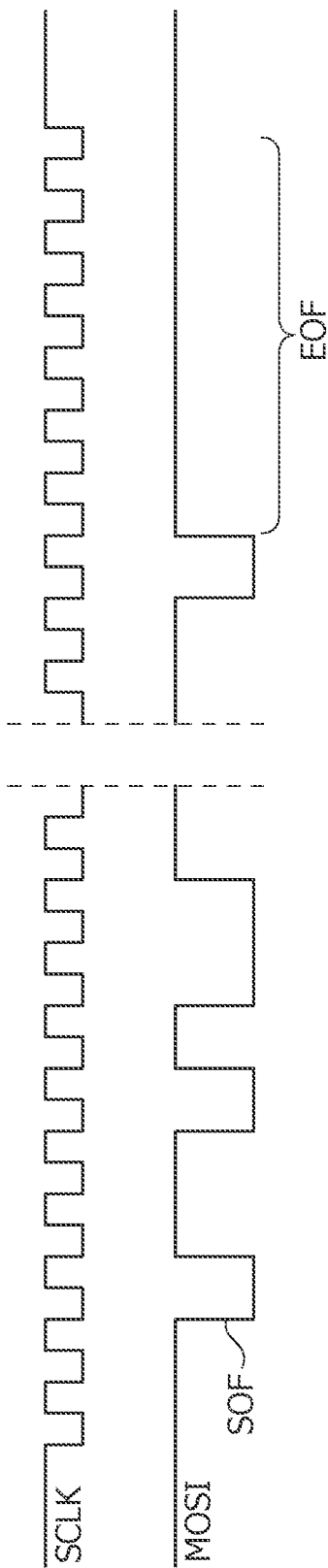
FIG. 15 shows an embodiment of the use of the circuit of FIG. 14 in order to transmit a CAN FD Light frame.

Specifically, as shown in FIG. 15, in order to correctly signal the start of a new frame, the signal MOSI/TXD should change from the recessive level to the dominant level, e.g., from high to low. Moreover, when maintaining the signal MOSI/TXD at the dominant level, e.g., low, a possible data transmission of another device connected to the CAN FD bus 20 may be inhibited.

In this respect, a SPI interface is usually configured such that the signal MOSI is maintained at the last logic level when the transmission circuit $504_{TX}$ is inactive. For example, as shown in FIG. 14, in order to disable the shift register (and the clock signal SCLK), the transmission circuit $504_{TX}$, e.g., directly the clock management circuit 5044, may comprise a logic gate 5064 receiving at input the clock signal $CLK_2$ and the transmission enable signal TX_EN, and providing at output the clock signal SCLK, which is used by the shift register 5040.

Accordingly, in order to correctly transmit the start-of-frame condition of a CAN FD Light frame stored to the transmission data TD1 . . . TDk, the processing core 102a does not have to add only the start-of-frame bit SOF with the dominant level, but the processing core 102a preferably also adds prior to the start-of-frame bit SOF one or more bits set to the recessive. For example, assuming that the dominant level is low, the processing core 102a adds one or more bits "1" followed by the start-of-frame bit SOF set to "0" (see also FIG. 15). Accordingly, in this way, in response to determining that a data transmission operation is requested, the communication interface 50:

transfers the first data word TD1 from transmission data register DATATX to the shift register 5040, and the transmission control circuit 5046 asserts the transmission enable signal TX_EN, thus enabling the shift operation of the shift register 5040 (e.g., by enabling the clock signal SCLK), whereby the shift register 5040 sequentially provides the bits of the first data word TD1, wherein the first bits of the data word TD1 consist in a sequence of one or more bits set to the recessive level followed by the start-of-frame bits SOF set to the dominant level.

The DMA channel $DMA_1$ may then transfer further data words TD from the memory 104b to the transmission data register, which are then transmitted by the transmission circuit $504_{Tx}$.

Conversely, in order to correctly transmit the seven end-of-frame bits EOF of the CAN FD Light frame, it is not necessary that the processing core 102a indeed adds seven end-of-frame bits EOF to the last data word TDk, but it is sufficient that the processing core 102a adds at least one bit having the recessive level. For example, in various embodiments, the processing core 102a is configured to fill the last bits of the last frame TDk (after the bit position corresponding to the bit AD) all with the logic level assigned to the recessive level, e.g., high, thereby ensuring that the signal MOSI remains set to the recessive level when the transmission control circuit 5046 disables the shift register 5040.

In line with the description of FIG. 10, the receiver portion of the SPI interface may in this case be used to monitor the transmission of the data.

Figure 16:
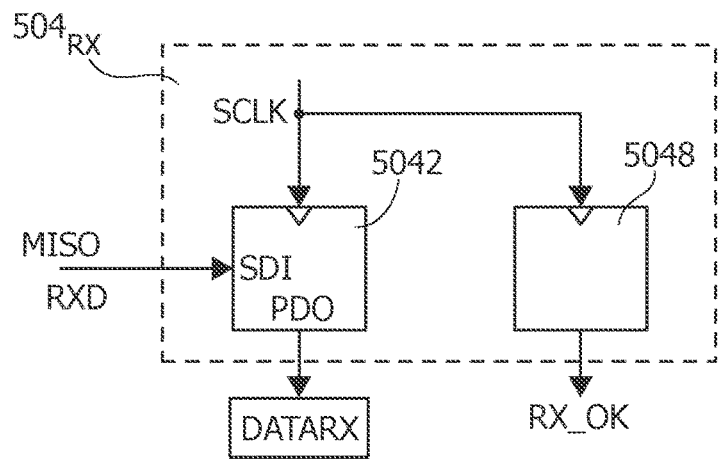
FIG. 16 shows an example of the reception portion of a hardware SPI interface.

Specifically, as shown in FIG. 16, a reception circuit $504_{RX}$ of a SPI master interface comprises a shift register 5042 configured to store the logic level of a signal MISO (Master In Slave Out) synchronously in response to the clock signal SCLK. Typically, the reception circuit $504_{RX}$ comprises also a receiver control circuit 5048, configured to assert the signal RX_OK when a given number of bits has been receives, such as 8 or 16 bits. Generally, due to the fact that the transmission control circuit 5046 and the receiver control circuit 5048 essentially implement the same operation, i.e., counting the number of clock cycles of the clock signal SCLK, these circuit may also be combined and implemented with the same control circuit.

Accordingly, in order to implement the read-back function, it is sufficient to connect the MISO line of the SPI interface to the RXD signal (terminal RX) of the CAN transceiver 320, whereby the transmitted data are than received back and stored to the reception shift register 5042. Moreover, in response to the reception signal RX_OK, the data may be transferred from the reception shift register 5042 to the reception data register DATARX, and the DMA channel $DMA_2$ may be used to transfer the received data from the reception data register DATARX to the memory 104b.

While this sampling works for the processing system 10a transmitting data, a processing system 10a receiving data cannot simply use the reception circuit $504_{RX}$ of the SPI interface. In fact, as described, e.g., with respect to FIG. 8, indeed a CAN FD Light receiver should detect the start-of-frame bit SOF, as implemented in the receiver control circuit 5048, detect the end-of-frame sequence EOF and preferably resynchronize the clock signal $CLK_2$/SCLK in response to the edges of the signal RXD from the recessive level to the dominant level.

However, these operations are not implemented in a conventional SPI receiver.

Figure 17:
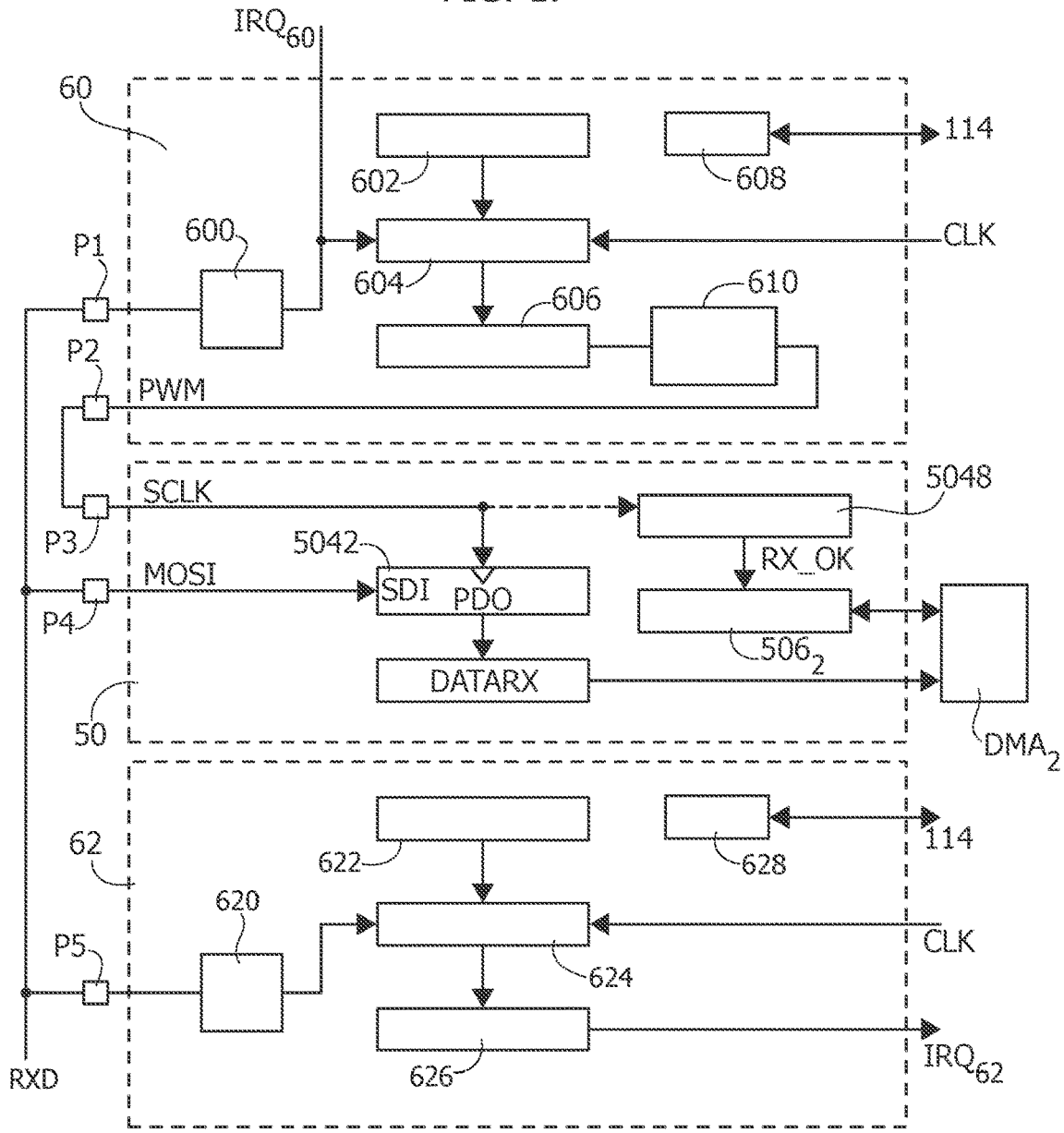
FIG. 17 shows an embodiment of a processing system configured to use the circuit of FIG. 16 in order to receive a CAN FD Light frame.

FIG. 17 shows in this respect an embodiment of the processing system 10a configured to use a SPI communication interface 50 as CAN FD Light receiver.

Specifically, in FIG. 17 are shown for simplicity only:
the reception shift register 5042,
the reception data register DATARX,
the (receiver) control circuit 5048 generating the reception control signal RX_OK; and
the DMA interface circuit $506_2$ configured to communicate with the DMA channel $DMA_2$ in response to the reception control signal RX_OK.

Specifically, when the SPI communication interface 50 is configured as slave interface, the clock signal SCLK is not generated via the clock downscaling circuit 5044 but received via a pin/pad P3. Moreover, due to the fact that by naming convention the reception shift register 5042 receives in this case via a pin/pad P4 the signal MOSI (generated by a SPI transmitter/master), the above circuits are configured to:

sequentially store, in response to the clock signal SCLK, the logic level of the signal MOSI received via the pin/pad P4, which is connected to the signal RXD provided by the CAN FD transceiver, and in response to having stored a given number of bits (as signaled via the control circuit 5048), transfer the stored data via a DMA transfer to the memory 104b.

Thus, the SPI (slave) circuit 50 continues to receive data and transfer the received data (once having received a given number of bits) via the DMA channel $DMA_2$ to the memory 104a as long as the clock signal SCLK is activated.

However, as described in the foregoing, the CAN FD Light protocol is an asynchronous communication protocol. Accordingly, the (receiving) processing system 10a has to generate the clock signal SCLK on its own.

Specifically, in various embodiments, the clock signal SCLK is generated via a programmable general-purpose hardware timer circuit 60 of the processing system 10a, such as a PWM signal generator circuit configured to generate a PWM signal PWM. For example, the timer circuit 60 may be configured to generate the clock signal SCLK (such as the signal PWM) at a pin/pad P2 and the pin/pad P2 is connected externally (with respect to the integrated circuit 30a of the processing system 10a) to a second pin/pad P3 configured to receive the clock signal SCLK for the SPI communication interface 50.

For example, a possible implementation of a general-purpose timer is described in document "Application note AN4776—General-purpose timer cookbook for STM32 microcontrollers", Rev 3, 2019, STMicroelectronics, which is hereby incorporated herein by reference.

For example, in the embodiment considered, the timer circuit 60 comprises a timer counter 604 configured to increase (or decrease) a count value in response to a clock signal CLK, such as a system clock. The counter 604 has associated a register 602, so called autoreload register, configured to store the value of a target count value. Specifically, if the timer counter 604 is configured as up-counter and it reaches the content of the timer autoreload register, then the timer counter 604 resets itself and a new counting cycle is restarted. Conversely, when the timer counter 604 is configured as down-counter and it reaches the zero value, then the timer counter value is set to the content of the timer auto-reload register 602 and a new counting cycle is restarted. Thus, essentially the timer counter 604 is configured to periodically count a given number of clock cycles as indicated by the value stored to the register 602.

Moreover, the timer circuit 60 comprises a comparator 606 configured to generate the PWM signal by comparing the timer count value (provided by the counter 604) with a reference value. Accordingly, in this way, the value stored to the timer autoreload register 602 may be used to define the frequency of the PWM signal PWM, and the reference value of the comparator 606 may be used to define the duty cycle of the PWM signal PWM. In various embodiments, the autoreload value and the reference value are programmable. For example, for this purpose the timer circuit 60 may comprise a slave interface 608 connected to the communication system 114, wherein the autoreload value and the reference value may be programmed by sending one or more write requests (comprising the address associated with the register(s) used to store to autoreload value and the reference value) to the communication system 114.

In various embodiments, the timer circuit 60 comprises also an output control circuit 610. For example, such an output control circuit 610 may be configured to forward the PWM signal PWM to the pin/pad P2.

Accordingly, by configuring the timer circuit 60 in a suitable manner (e.g., by writing the autoreload value and the reference value), the hardware timer circuit 60 is configured to generate at the pin/pad P2 a PWM signal having the requested CAN FD Light frequency, such as, e.g., 1 Mhz. Accordingly, by connecting externally the pin/pad P2 to the pin/pad P3, the SPI slave interface 50 receives a clock signal SCLK having (approximately) the correct clock frequency.

However, the clock signal SCLK used by the SPI receiver 50 may be phase shifted with respect to the clock signal SCLK used by the SPI transmitter. Accordingly, as mentioned before, the clock signal SCLK should be resynchronized based on the rising and/or preferably falling edge of the signal RXD.

For example, in various embodiments, the previous mentioned general-purpose timer circuit 60 (e.g., of a STM32 microcontroller) also comprises an edge detector 600, which may be configured (e.g., via the Timer Slave Mode Control Register TIMx_SMCR) to reset the timer counter 604 (to the autoreload value in case of down-counter or to zero in case of an up-counter) in response to a falling edge of a signal received at a pin/pad P1. Accordingly, by connecting the pin/pad P1 to the signal RXD, the timer counter 604, and thus the clock signal SCLK, is resynchronized with the falling edge of the signal RXD.

Accordingly, by setting the duty cycle of the PWM signal (via the ratio between the reference value of the comparator 608 and the autoreload value), the shift register 5042 may correctly sample the values of the reception signal RXD. For example, in various embodiments, the duty cycle of the signal PWM is set to a value between 30% and 80%, preferably between 40% and 60%, e.g., approximately 50%.

Generally, such general-purpose hardware timer circuits 60 are often also provided in modern micro-controllers. In this respect, the specific details how to configure such general-purpose timer circuits as PWM signal generators to fulfil the above requirements may slightly vary based on the used microcontroller and can be found in the respective microcontroller reference manual.

As mentioned before, the timer circuit 60 is able to generate the clock signal SCLK for the SPI receiver 50. However, the SPI receiver 50 should only be active when a CAN FD Light frame is transmitted, as indicated by the start-of-frame bit SOF. Generally, the SPI receiver 50 may be deactivated by disabling the clock signal SCLK, i.e., by disabling the timer circuit 60, and/or by disabling the SPI receiver 50.

In the embodiment considered, the start-of-frame bit may thus be detected by an edge detector configured to generate a trigger in response to a falling edge of the signal RXD. Accordingly, the timer counter 604 or the SPI interface 50 should be activated in response to this trigger signal.

In this respect, the general-purpose timer circuit 60 of a STM32 microcontroller unfortunately does not permit to configure the timer counter 604 to combine the timer start and the timer reset event based on an external signal. However, the timer reset event may be used to generate a trigger in an interrupt signal $IRQ_{60}$ provided to the processing core 102a.

Accordingly, in various embodiments, the processing core 102a may configure the timer circuit 60 as described in the foregoing, also including the reset of the timer counter circuit 604 via the signal provided by the edge detector 600. However, initially the processing core 102a disables the timer counter circuit 604 and enables the interrupt signal $IRQ_{60}$. Accordingly, once a start-of-frame bit SOF is transmitted, the edged detector 600 generates the interrupt signal $IRQ_{60}$. In response to the interrupt signal $IRQ_{60}$, the processing core 102a may then enable the timer counter circuit 604 and optionally disable the interrupt signal $IRQ_{60}$. In general, also an additional edge detector may be used to generate a similar interrupt signal.

However, this result in a delay between the SOF edge, and the timer start. Due to the fact that this delay is usually constant and corresponds to a given number of clock cycles of the clock signal CLK, the processing core 102a may configure for the first cycle of the timer counter 604 a smaller autoreload value compensating this delay, and then program the autoreload value corresponding to the requested CAN FD Light transmission rate. Preferably, the processing core 102 also reconfigures the reference value of the comparator 608 in order to obtain approximately the same duty-cycle.

Generally, instead of disabling/enabling the counter 604, the processing core 102a may disable/enable the SPI receiver 50.

Accordingly, in various embodiments, the same general-purpose timer circuit 60 may be used for both to detect the start-of-frame bit SOF and to generate the clock signal SCLK.

Conversely, an additional programmable hardware timer circuit 62 may be used to detect the end-of-frame sequence EOF. For example, in the embodiment considered, also the timer circuit 60 comprises:

- a timer counter 624 having associated an autoreload register 622;
- a comparator 622 configured to generate a signal when the count value of the timer counter 624 reaches a reference value;
- an edge detector 620 configured to reset the timer counter 624 in response to an edge of a signal received via a pin/pad P5, however this time a rising edge; and
- a slave interface 628 for programming the autoreload value stored to the register 622 and the reference value of the comparator 626, and for enabling the timer counter 624.

Generally, the timer circuit 62 is configured to generate an interrupt $IRQ_{62}$ when the count value of the timer circuit 62 reaches a given threshold value. For example, based on the implementation of the timer circuit 62, this may be obtained by:

- setting the autoreload value to the threshold value and using the reset event of the counter 624 as interrupt signal $IRQ_{62}$, or
- setting the reference value of the comparator 626 to the threshold value and using the comparison value of the comparator 626 as interrupt signal $IRQ_{62}$.

Accordingly, by connecting the pin/pad P5 to the signal RXD, the timer circuit 62 essentially operates as a watchdog timer, which is reset in response to a rising edge of the signal RXD.

Accordingly, by setting the threshold value of the timer circuit/watchdog timer 62 to a value correspond to the time of (at least) eight bits of a CAN FD Light frame, the timer circuit 62 asserts the interrupt signal $IRQ_{62}$ once eight consecutive bits being set to high are received via the signal RXD.

Alternatively, the timer circuit 62 may be configured to, when the signal RXD is set to high, increase the count value in response to the signal PWM, which thus indicates the number of consecutive received bits being set to high, and assert the interrupt signal $IRQ_{62}$ when the count value reaches eight. Also in this case, the count value is reset when signal RXD is set to low.

Generally, the actual EOF field detection in hardware is purely optional. Specifically, in case the receiver circuit, such as the CAN FD Light controller/commander, knows already the maximum number of bits adapted to be received from a given transmitter circuit, such as a given CAN FD Light responder, the receiver circuit may be configured to always receive the maximum number of bits and the processing core 102a may be configured to process the received CAN FD frame via software instructions in order to detect the EOF field.

Accordingly, in this case, the timer circuit 62 may be:

- configured as a timer/counter circuit using a threshold value corresponding to the time of the maximum number of bits adapted to be received from a given transmitter; or
- configured as counter circuit configured to increase a count value in response to the signal PWM, which thus indicates the number of received bits, and assert the interrupt signal $IRQ_{62}$ when the count value reaches a given threshold value indicative of the maximum number of bits adapted to be received from a given transmitter.

Accordingly, in various embodiments, the processing core 102a may be configured to:

- configure the SPI interface 50 as slave interface;
- configure the autoreload value and the reference value of the timer circuit 60 for the first bit SOF;
- enable the interrupt $IRQ_{60}$;
- in response to the interrupt, enable the timer counter 604, reprogram the autoreload value and the reference value of the timer circuit 60 for the following bits, and enable the timer counter 62.

Generally, instead of using the edge detector 600 for detecting the start-of-frame bit SOF, also the edge detector 620 of the timer circuit 62 or another edge detector may be used to generate the interrupt signaling the start-of-frame bit. For example, when using the edge detector 620, the processing core 102a should be configured, in response to the interrupt, enable the timer counter 604, reprogram the autoreload value and the reference value of the timer circuit 60 for the following bits, and reprogram the interrupt behavior of the timer circuit 62.

Moreover, the processing core 102a configures the SPI interface 50 and the DMA channel $DMA_2$. Specifically, in this way, the SPI receiver 50 may generate the DMA transfer request $REQ_2$ once a given number of bits, such as 8 or 16 bits, has been received, and the DMA channel $DMA_2$ transfers these bits to the memory 104b.

However, this also implies that the SPI interface 50 expects to receive a given number of bits prior to generating the DMA request, such as 8 of 16 bits. On the one hand this implies that the processing core 102 should preferably be configured to reset the shift register 5042 prior to receiving data, thereby avoiding that the received data are not correctly aligned. Moreover, the processing core 102a should verify that the end-of-frame bits EOF have been transferred to the memory 104b and possible read the remaining data (not transferred automatically via the DMA channel $DMA_2$) from the SPI interface 50, or enable the timer circuit 60 in order to virtually receive further bits, which then trigger a new DMA transfer.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A processing system comprising:
a Serial Peripheral Interface (SPI) communication interface; and
a microprocessor communicatively connected to the SPI communication interface, wherein the microprocessor, when in a CAN FD Light data transmission mode, is configured to:
program a control register of the SPI communication interface in order to activate a master mode;
generate a transmission CAN FD Light frame;
store the transmission CAN FD Light frame to a memory; and
activate a first DMA channel so that the first DMA channel is able to sequentially transfer the transmission CAN FD Light frame from the memory to a transmission shift register of the SPI communication interface.

2. The processing system according to claim 1, wherein the transmission shift register is configured to generate a transmission signal by sequentially providing its content in response to a first clock signal.

3. The processing system according to claim 2, wherein SPI communication interface comprises a clock downscale circuit configured to:
receive a clock signal; and
generate a downscaled clock signal by downscaling the clock signal as a function of a clock scaling factor, wherein the downscaled clock signal is the first clock signal.

4. The processing system according to claim 3, wherein the control register is configured to store data identifying the clock scaling factor and data identifying a mode of operation, the mode of operation indicating the master mode or a slave mode.

5. The processing system according to claim 1, further comprising activating, by the microprocessor, data transmission of the transmission CAN FD Light frame via a transmission terminal.

6. A method for operating a processing system comprising a Serial Peripheral Interface (SPI) communication interface and a microprocessor communicatively connected to the SPI communication interface, the method comprising:
programming, by the microprocessor, when in a CAN FD Light data transmission mode, a control register of the SPI communication interface in order to activate a master mode;
generating, by the microprocessor, a transmission CAN FD Light frame;
storing, by the microprocessor, the transmission CAN FD Light frame to a memory; and
activating, by the microprocessor, a first DMA channel so that the first DMA channel sequentially transfers the transmission CAN FD Light frame from the memory to a transmission shift register of the SPI communication interface.

7. The method according to claim 6, further comprising generating, by the transmission shift register, a transmission signal by sequentially providing its content in response to a first clock signal.

8. The method according to claim 7, further comprising:
receiving, by the SPI communication interface, a clock signal; and
generating, by the SPI communication interface, a downscaled clock signal by downscaling the clock signal as a function of a clock scaling factor, wherein the downscaled clock signal is the first clock signal.

9. The method according to claim 8, wherein the control register is stores data identifying the clock scaling factor and data identifying a mode of operation, the mode of operation indicating the master mode or a slave mode.

10. The method according to claim 6, further comprising activating, by the microprocessor, data transmission of the transmission CAN FD Light frame via a transmission terminal.

11. A processing system comprising:
a Serial Peripheral Interface (SPI) communication interface; and
a microprocessor communicatively connected to the SPI communication interface, wherein the microprocessor, when in a CAN FD Light data reception mode, is configured to:
program a control register of the SPI communication interface in order to activate a slave mode;
in response to receive a first control signal, enable a first hardware timer circuit and a second hardware timer circuit, wherein a second DMA channel is able to transfer packets of a given word size from a reception shift register to a memory thereby sequentially transferring a reception CAN FD Light frame from the reception shift register to the memory; and
in response to a second control signal, read the reception CAN FD Light frame from the memory.

12. The processing system according to claim 11, wherein the reception shift register of the given word size is configured to sequentially add a logic level of a reception signal to a content of the reception shift register in response to a second clock signal.

13. The processing system according to claim 12, further comprising an edge detector configured to assert the first control signal in response to detecting a falling edge in the reception signal.

14. The processing system according to claim 12, wherein the SPI communication interface is configured to provide, in the slave mode, a clock signal received at a clock terminal as the second clock signal to the reception shift register.

15. The processing system according to claim 14,
wherein the first hardware timer circuit is configured to, when enabled, generate the clock signal at the clock terminal, and
wherein the second hardware timer circuit comprising a counter configured to, when enabled, increase a count value and assert the second control signal in response to determining that the count value reaches a given threshold value.

16. A method for operating a processing system comprising a Serial Peripheral Interface (SPI) communication interface and a microprocessor communicatively connected to the SPI communication interface, the method comprising:
programming, by the microprocessor, when in a CAN FD Light data reception mode, a control register of the SPI communication interface in order to activate a slave mode;
in response to receive a first control signal, enabling a first hardware timer circuit and a second hardware timer circuit, wherein a second DMA channel is able to transfer packets of a given word size from a reception shift register to a memory thereby sequentially transferring a reception CAN FD Light frame from the reception shift register to the memory; and
in response to a second control signal, reading the reception CAN FD Light frame from the memory.

17. The method according to claim 16, further comprising sequentially adding, by the reception shift register of the given word size, a logic level of a reception signal to a content of the reception shift register in response to a second clock signal.

18. The method according to claim 17, further comprising asserting, by an edge detector, the first control signal in response to detecting a falling edge in the reception signal.

19. The method according to claim 17, further comprising providing, by the SPI communication interface, in the slave mode, a clock signal received at a clock terminal as the second clock signal to the reception shift register.

20. The method according to claim 19, further comprising:
- generating, by the first hardware timer circuit, when enabled, the clock signal at the clock terminal; and
- increasing, by the second hardware timer circuit comprising a counter, when enabled, a count value and asserting the second control signal in response to determining that the count value reaches a given threshold value.

\* \* \* \* \*

UNITED STATES PATENT AND TRADEMARK OFFICE
CERTIFICATE OF CORRECTION

PATENT NO. : 12,184,448 B2
APPLICATION NO. : 18/489590
DATED : December 31, 2024
INVENTOR(S) : Vaclav Dvorak and Fred Rennig Page 1 of 1

It is certified that error appears in the above-identified patent and that said Letters Patent is hereby corrected as shown below:

In the Claims

In Column 27, Line 25, Claim 3:
Change "SPI communication interface comprises a clock downscale"
To --the SPI communication interface comprises a clock downscale--

In Column 28, Line 4, Claim 9:
Change "register is stores data identifying the clock scaling factor"
To --register stores data identifying the clock scaling factor--

Signed and Sealed this
Twenty-fifth Day of February, 2025

Coke Morgan Stewart
*Acting Director of the United States Patent and Trademark Office*